(12) United States Patent
Sasagawa

(10) Patent No.: US 8,694,451 B2
(45) Date of Patent: Apr. 8, 2014

(54) NEURAL NETWORK SYSTEM

(75) Inventor: Yukihiro Sasagawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 224 days.

(21) Appl. No.: 13/233,196

(22) Filed: Sep. 15, 2011

(65) Prior Publication Data

US 2012/0005141 A1 Jan. 5, 2012

Related U.S. Application Data

(63) Continuation of application No. PCT/JP2009/004483, filed on Sep. 10, 2009.

(30) Foreign Application Priority Data

Mar. 18, 2009 (JP) ................................. 2009-066925

(51) Int. Cl.
*G06F 15/18* (2006.01)
*G06N 3/08* (2006.01)

(52) U.S. Cl.
USPC .......................................................... 706/25

(58) Field of Classification Search
USPC .......................................................... 706/25
See application file for complete search history.

(56) References Cited

U.S. PATENT DOCUMENTS

| | | | |
|---|---|---|---|
| 4,866,645 A | 9/1989 | Lish | |
| 5,142,612 A * | 8/1992 | Skeirik | 706/23 |
| 5,422,983 A * | 6/1995 | Castelaz et al. | 706/42 |
| 5,524,175 A | 6/1996 | Sato et al. | |
| 5,649,070 A | 7/1997 | Connell et al. | |
| 6,332,137 B1 | 12/2001 | Hori et al. | |
| 7,088,860 B2 | 8/2006 | Matsugu et al. | |

(Continued)

FOREIGN PATENT DOCUMENTS

| | | |
|---|---|---|
| JP | 01-237754 A | 9/1989 |
| JP | 03-094364 A | 4/1991 |

(Continued)

OTHER PUBLICATIONS

'An Artificial Neural Networks Primer with Financial Applications Examples in Financial Distress Predictions and Foreign Exchange Hybrid Trading System' by Dr Clarence N W Tan, PhD.*

(Continued)

*Primary Examiner* — Kakali Chaki
*Assistant Examiner* — Ababacar Seck
(74) *Attorney, Agent, or Firm* — McDermott Will & Emery LLP

(57) ABSTRACT

A neural network system that can minimize circuit resources for constituting a self-learning mechanism and be reconfigured into network configurations suitable for various purposes includes a neural network engine that operates in a first and a second operation mode and performs an operation representing a characteristic determined by setting network configuration information and weight information with respect to the network configuration, and a von Neumann-type microprocessor that is connected to the neural network engine and performs a cooperative operation in accordance with the first or the second operation mode together with the neural network engine. The von Neumann-type microprocessor recalculates the weight information or remakes the configuration information as a cooperative operation according to the first operation mode, and sets or updates the configuration information or the weight information set in the neural network engine, as a cooperative operation according to the second operation mode.

11 Claims, 25 Drawing Sheets

(56) References Cited

U.S. PATENT DOCUMENTS

| | | | |
|---|---|---|---|
| 7,293,002 | B2 | 11/2007 | Starzyk |
| 2002/0181775 | A1 | 12/2002 | Matsugu et al. |
| 2002/0181799 | A1 | 12/2002 | Matsugu et al. |
| 2006/0112028 | A1* | 5/2006 | Xiao et al. .................. 706/15 |
| 2006/0228027 | A1 | 10/2006 | Matsugu et al. |

FOREIGN PATENT DOCUMENTS

| | | |
|---|---|---|
| JP | 5-61843 A | 3/1993 |
| JP | 06-195322 A | 7/1994 |
| JP | 07-302292 A | 11/1995 |
| JP | 2000-035955 A | 2/2000 |
| JP | 2001-014470 | 1/2001 |
| JP | 2002-358503 | 12/2002 |

OTHER PUBLICATIONS

Japanese Office Action issued in Japanese Patent Application No. 2011-504616 mailed on Apr. 23, 2013.

Takashi Morie et al., "AD Yugo Hoshiki Gazo Tokucho Chushutsu LSI to sore o Mochiita Shizen Gazo Ninshiki System no Kenkyu Kaihatsu (Research and development of image feature extraction LSI in analog-digital fusion basis, and nature image recognition system using thereof)", Scientific Research on Priority Area, Intelligent Instantaneous Processing Complex Integrated System, Public annual symposium in Heisei 14 (final) , Mar. 2003, pp. 57-79, with partial English translation.

Hirokazu Madokoro et al., "Real Time Gazo Shori-yo Digital Neuro Processor no Kaihatsu (Hardware Implementation of Neural Networks for Real Time Image Processing)", IEICE Technical Report vol. 104, No. 741 , Mar. 10, 2005 , pp. 13-17.

Masayuki Ito et al., "Doteki Saikosei Kano FPGA Algorithm no Jisso (A Design of Dynamically Reconfiguarable FPGA and An Implementation of Parallel Algorithm on it)", IPSJ SIG Notes, vol. 98, No. 43, May 22, 1998, pp. 1-8.

Jiang Shan et al., "Biologically Inspired Spinal locomotion Controller for Humanoid Robot", Proceedings of The 19th Annual Conference of the Robotics Society of Japan, Sep. 2001, pp. 517-518.

Fukushima et al., "Development and Evaluation of Internal Diagnosis Support System Utilizing a Neural Network", Lecture Article No. 431 in 18th Kumamoto Pref. Industry-Academia-Government Technology Meeting, Jan. 27, 2004, with partial English translation.

"IBM ZISC036 Neurons User's Manual Version 1.2", May 15, 1998.

International Search Report and Written Opinion for PCT/JP2009/004483, dated Nov. 24, 2009 along with an english translation of ISR.

International Preliminary Report on Patentability, dated Feb. 22, 2011.

* cited by examiner

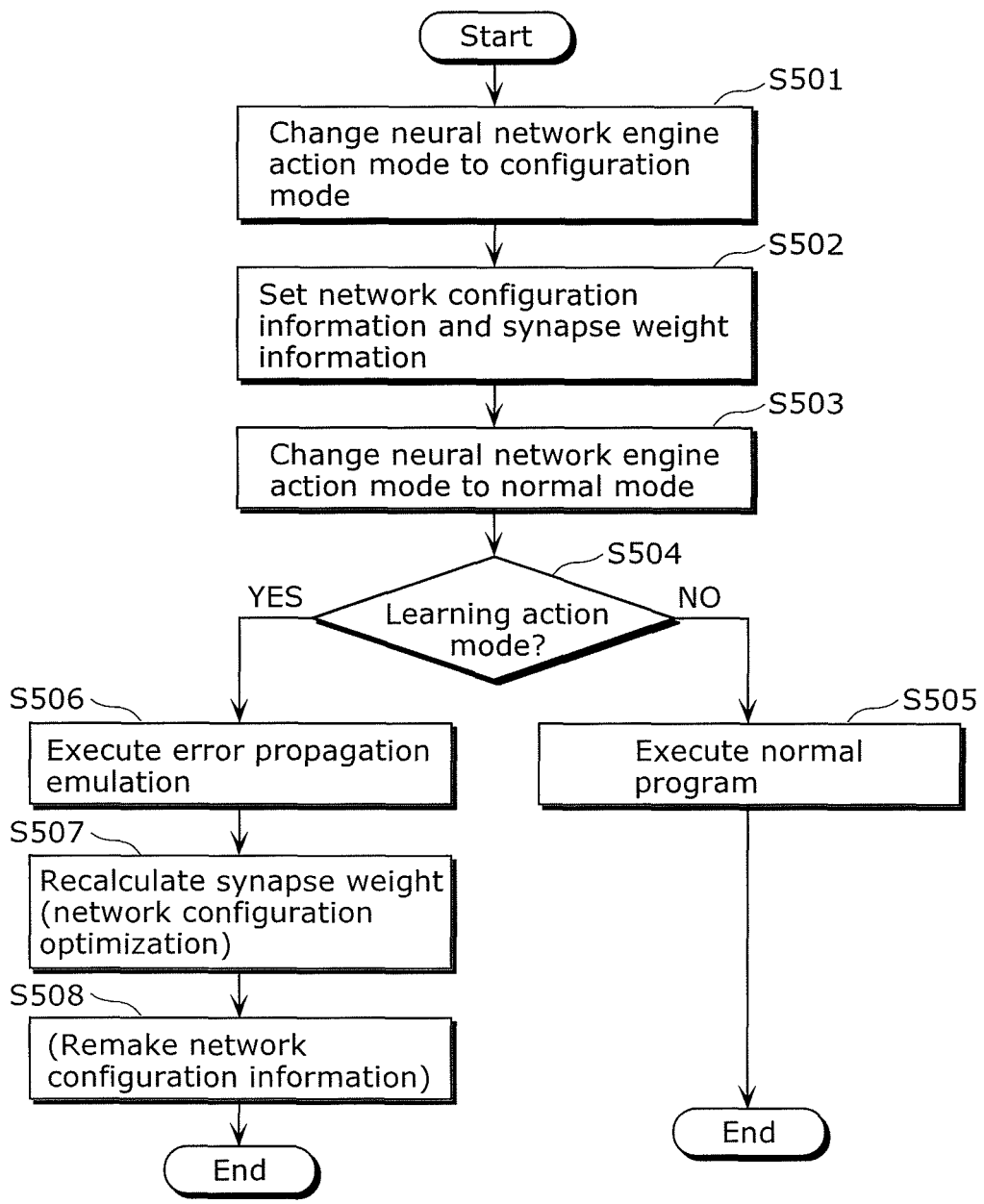

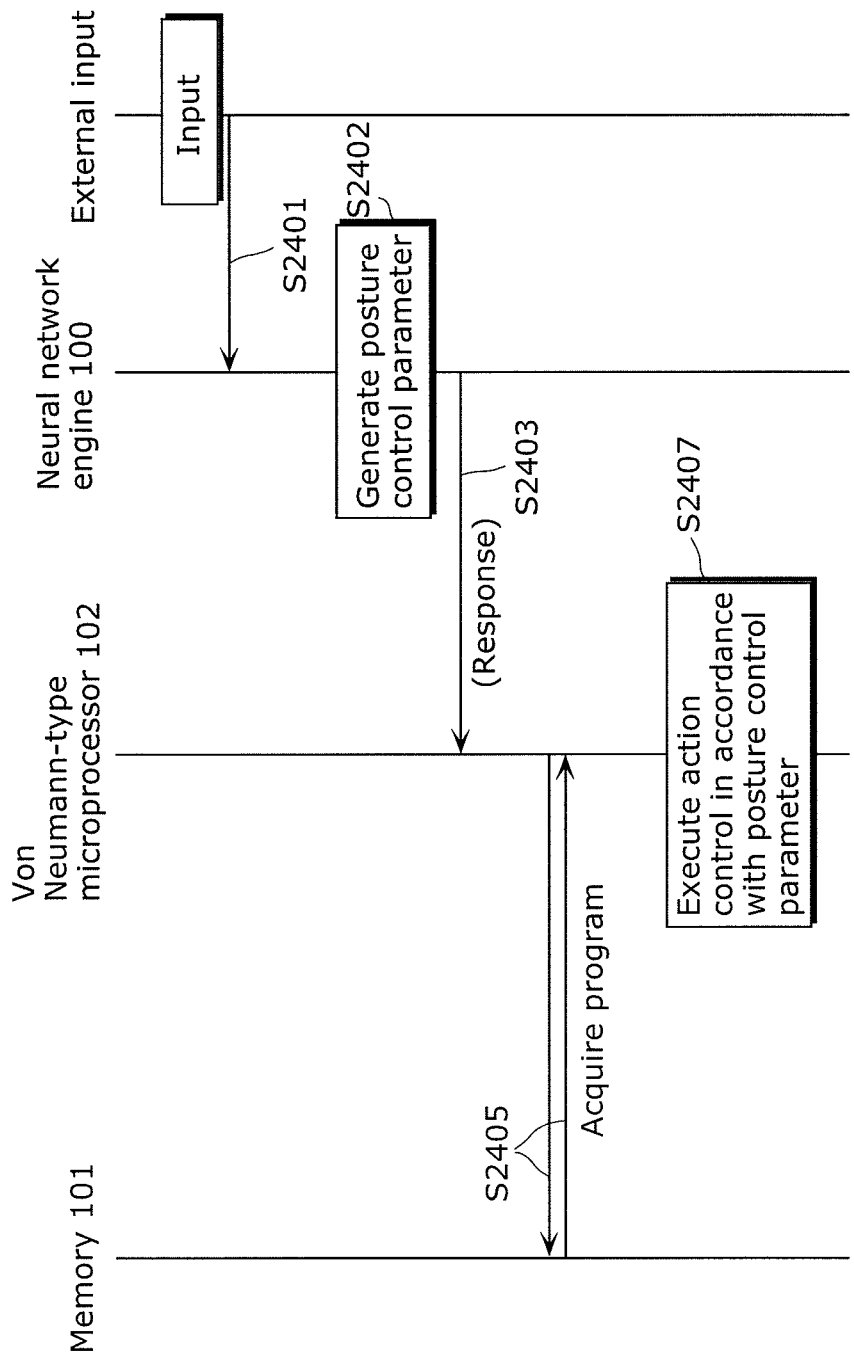

NEURAL NETWORK SYSTEM

CROSS REFERENCE TO RELATED APPLICATION

This is a continuation application of PCT application No. PCT/JP2009/004483 filed on Sep. 10, 2009, designating the United States of America.

BACKGROUND OF THE INVENTION (1) Field of the Invention

The present invention relates to a reconfigurable neural network system.

(2) Description of the Related Art

Methods of performing cognitive signal processing such as face recognition and sound recognition utilizing a neural network are widely known.

The neural network simulates a signal processing system constituted of a neuron network in a human's brain, to perform neural signal processing in which mutually connected neuron cells operate in parallel. Such a process allows objects that are difficult to formularize, such as data containing a noise and a variety of faces and voices, to be flexibly and rapidly recognized. The neuron cell is a simulated model of a neuron structure, and serves to perform the neural signal processing in connection with other neuron cells or input devices. The neuron cell receives as input signals the output results of other neuron cells or input devices connected thereto, and performs an operation (reaction) in response to a specific input, in accordance with weight information of the respective input signals. Thus, a desired operation can be performed.

FIG. 13A schematically illustrates a popular mathematical model of the neuron cell. The mathematical model of the neuron cell shown in FIG. 13A operates in accordance with the following equations (1) to (3).

$$y = f(u) \tag{1}$$

$$u = \sum_{i=1}^{6} w_i x_i - T \tag{2}$$

$$f(u) = \frac{1}{1 + \exp(-u)} \tag{3}$$

In FIG. 13A, reference numerals $x_1$ to $x_6$ represent input signals from other neuron cells or input devices. Numerals $w_1$ to $w_6$ are quantities indicating combination efficiency of the input signals, and represent a weight with respect to $x_1$ to $x_6$. Value y is an output signal determined on the basis of the plurality of input signals $x_1$ to $x_6$.

In this mathematical model of the neuron cell, when the plurality of input signals $x_1$ to $x_6$ is inputted, the input x ($x_1$ to $x_6$ in this case) is multiplied by the weight w given to the respective input x ($w_1$ to $w_6$ in this case), and then u is obtained by subtracting an offset T from the total amount of the multiplication products, as shown in the equation (2). Here, the offset T corresponds to a threshold to determine whether the neuron cell is to react to a specific input.

Then a value obtained by substituting u calculated as above in the activation function f(u) expressed as the equation (1) constitutes the output y of the neuron cell. In this model, the sigmoid function expressed as the equation (3) determines the level of the output y. Specifically, y up to the threshold is outputted at a Low level, and y exceeding the threshold is outputted as a High level.

FIG. 13B is a graph showing a curve defined by the sigmoid function. The sigmoid function has asymptotic lines to y=0 and y=1 as shown in FIG. 13B, and the value of y remains within the range of 0 to 1 with respect to all values on the x axis. The sigmoid function also has an inflection point, and the curve is point-symmetric with respect to the inflection point. This also indicates that y up to the threshold is outputted at a Low level, and y exceeding the threshold is outputted as a High level.

Referring now to FIGS. 14A to 14D, typical structures of the neural network will be described.

FIG. 14A is a diagram showing a typical structure of a multilayer network.

The multilayer network refers to a network constituted of a plurality of neural layers, namely an input layer, an intermediate layer, and an output layer in which the neuron cells in the same neural layer are not connected, but the neuron cells in different neural layers are mutually connected.

The structure shown in FIG. 14A constituted of the three neural layers is known as perceptron, and is suitable for a pattern matching process.

FIG. 14B is a diagram showing a typical structure of a mutual connected network.

The mutual connected network refers to a network in which the neuron cells are mutually connected (coupled), instead of forming layers as in the multilayer network.

The structure shown in FIG. 14B is called Hopfield network in which the neuron cells are mutually connected, and has a characteristic that imperfect data containing a noise can be complemented and associated with a pattern in memory.

FIGS. 14C and 14D are diagrams showing other typical structures of the neural network.

The structure shown in FIG. 14C is called Elman network, in which feedback is made from another neural layer branched from the intermediate layer of the perceptron. The Elman network has a recursive structure that feeds back past information, and is hence suitable for recognizing a sequence pattern such as a grammar.

In addition, a central pattern generator (CPG) shown in FIG. 14D is also known, in which feedback is mutually performed between two neural layers. This structure is applied to posture control of a biped walking robot (see NPL 1: Jiang Shan, Fumio Nagashima, "Biologically Inspired Spinal Locomotion Controller for Humanoid Robot", 19th Annual Conference of the Robotics Society of Japan, pp. 517-518, 2001).

As described above, characteristic operations of the respective neural networks are determined on the basis of the combination of the network configuration and the weight information.

Now, the neural network can be implemented in the form of either software or hardware.

Implementing the neural network by software is not suitable for real-time processing because the neural network model has to be emulated using an ordinary computer, and hence software is employed, for example, for searching a huge database (see NPL 2: Fukushima, Kurahara, Torikoshi, et al., "Development and Evaluation of Internal Diagnosis Support System Utilizing a Neural Network", Lecture Article No. 431 in 18th Kumamoto Pref. Industry-Academia-Government Technology Meeting).

In contrast, implementation by hardware allows real-time processing to be performed, and is hence employed in image recognition systems. An implementation example of the neural network by hardware will be described hereunder.

FIG. 15 is a block diagram of a processor in which the neural network is implemented.

The processor shown in FIG. 15, called a ZISC processor, has a trilayer network configuration for performing cognitive processing (see NPL 3: IBM ZISC036 Neurons USER'S MANUAL Version 1.2). In this processor, the weight information can be set not only by a register but also by a self-learning mechanism, to obtain a desired operation.

The self-learning mechanism can be typically exemplified by weight information updating utilizing backward propagation. FIGS. 16A and 16B are diagrams showing an outline of a backward propagation process. As shown therein, in the backward propagation a teacher signal and reference data, which are ideal output signals, are given for error calculation in each neural layer, and the weight information is updated so as to minimize the error, to thereby accomplish a desired learning.

Further, an image recognition system utilizing the ZISC processor is disclosed (see PTL 1: Japanese Unexamined Patent Application Publication No. 2001-014470). FIG. 17 is a block diagram of the image recognition system that employs the ZISC processor. As shown in FIG. 17, the ZISC processor includes on its input side a data conversion processor that converts various image data into generalized data. Such conversion allows various data format to be processed using a single neural network configuration and the weight information.

SUMMARY OF THE INVENTION

However, the foregoing implementation methods have the following drawbacks.

Specifically, in the case of the implementation by hardware, the neural network requires circuit resources to constitute the self-learning mechanism. For example, to perform the backward propagation as shown in FIG. 16A, a signal line routed upstream in each neural layer and a circuit for error calculation have to be provided. Further, since the network configuration is fixed the applicable range is limited. To give a higher degree of freedom to the network configuration, circuit resources for the self-learning mechanism that satisfy the desired degree of freedom are required, which makes the implementation more difficult.

In the case of the implementation by software, utilizing the software for emulating the neural network model is time-consuming in terms of the reaction of the neuron cells and hence unsuitable for real-time processing, which leads to limited applications.

Further, the neural network is, intrinsically, excellent in cognitive processes but not suitable for sequential program processing, which also leads to limited applications.

The present invention has been accomplished in view of the foregoing situation, with an object to provide a neural network system that can minimize circuit resources for constituting a self-learning mechanism and that can be reconfigured into network configurations suitable for various purposes.

Accordingly, the present invention provides a neural network system including a neural network engine that operates in a first operation mode and a second operation mode and performs an operation representing a characteristic determined by setting network configuration information indicating a network configuration to be formed and weight information indicating a weight with respect to the network configuration; and a von Neumann-type microprocessor that performs a cooperative operation in accordance with the first operation mode or the second operation mode together with the neural network engine, the von Neumann-type microprocessor being connected to the neural network engine, wherein the neural network engine includes a neural processing element that performs neural signal processing; a routing switch; a memory containing control information of the neural processing element; a memory containing control information of the routing switch; an interconnect, and the von Neumann-type microprocessor recalculates the weight information or remake the network configuration information as a cooperative operation according to the first operation mode, and sets or updates the network configuration information or the weight information set in the neural network engine, as a cooperative operation according to the second operation mode.

The neural network system thus configured can minimize circuit resources for constituting a self-learning mechanism, and be reconfigured into network configurations suitable for various purposes.

Preferably, the von Neumann-type microprocessor may execute a program of emulating an error propagation process of the neural network engine as a cooperative operation according to the first operation mode, to thereby recalculate the weight information or remake the network configuration information.

Such an arrangement allows the neural network system to minimize circuit resources for constituting a self-learning mechanism, and to be reconfigured into network configurations suitable for various purposes.

The present invention also provides an operation method to be performed by a neural network system including a neural network engine that operates in a first operation mode and a second operation mode and performs an operation representing a characteristic determined by setting network configuration information and weight information with respect to the network configuration, and a von Neumann-type microprocessor connected to the neural network engine for performing a cooperative operation in accordance with the first operation mode or the second operation mode together with the neural network engine, the method comprising causing the von Neumann-type microprocessor to perform a first cooperative operation including recalculating the weight information or remaking the network configuration information as a cooperative operation according to the first operation mode; and to perform a second cooperative operation including setting or updating the network configuration information or the weight information set in the neural network engine, as a cooperative operation according to the second operation mode.

As described above, according to the present invention the neural network system includes the von Neumann-type microprocessor and the reconfigurable neural network engine, and performs the backward propagation, sequential program processing and so forth through cooperative operations between the constituents. For example, the backward propagation is executed through the neural network emulation by the von Neumann-type microprocessor and generation of reference data by the neural network engine. Such a configuration allows the circuit resources required by the conventional techniques for constituting the self-learning mechanism including the backward propagation, to be minimized. Also, since the von Neumann-type microprocessor performs sequential program processing in a normal operation mode, the processes that are unsuitable for the neural network engine can be complemented. Further, the neural network engine according to the present invention is reconfigurable, because the von Neumann-type microprocessor can serve to change the network configuration in various ways.

Thus, the present invention provides a neural network system that can minimize circuit resources for constituting a self-learning mechanism and that can be reconfigured into network configurations suitable for various purposes.

Further Information about Technical Background to this Application

The disclosure of Japanese Patent Application No. 2009-066925 filed on Mar. 18, 2009 including specification, drawings and claims is incorporated herein by reference in its entirety.

The disclosure of PCT application No. PCT/JP2009/004483 filed on Sep. 10, 2009, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 5 is a flowchart for explaining a process performed by a von Neumann-type microprocessor to determine each cooperative operation;

FIGS. 11A and 11B are diagrams for explaining another application example of the neural network system according to the embodiment 3;

DESCRIPTION OF THE PREFERRED EMBODIMENTS

Figure 1:
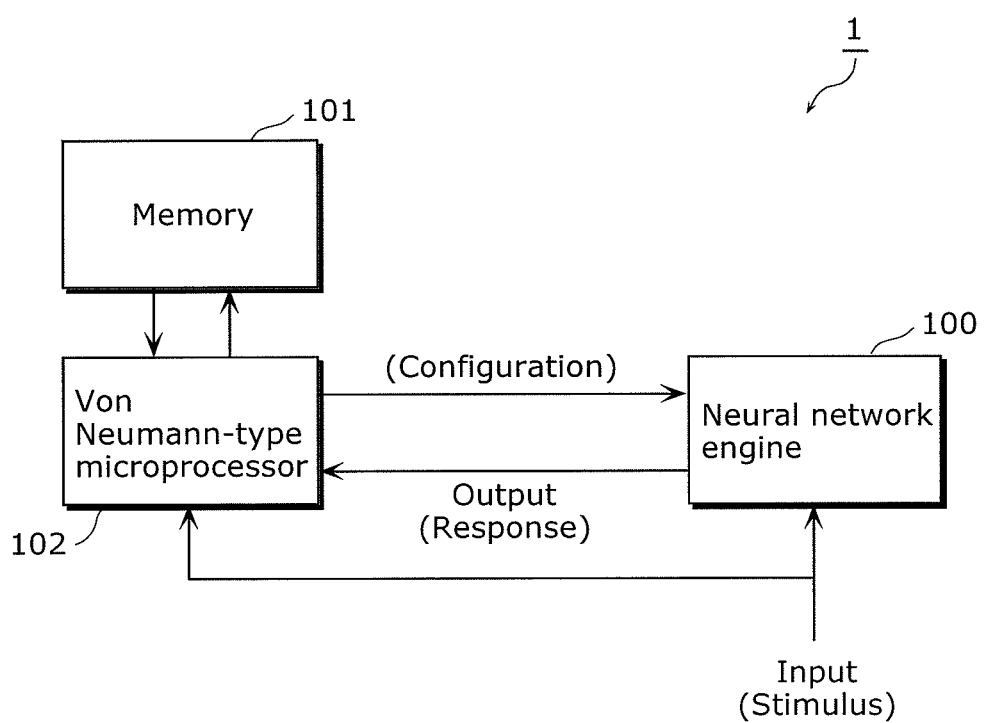
FIG. 1 is a block diagram of a neural network system according to an embodiment 1.

Hereafter, embodiments of the present invention will be described referring to the drawings.

Embodiment 1

FIG. 1 is a block diagram of a neural network system according to an embodiment 1.

The neural network system 1 shown in FIG. 1 includes a neural network engine 100 that can operate in a plurality of operation modes, a memory 101, and a von Neumann-type microprocessor 102.

In the neural network system 1, the neural network engine 100 and the von Neumann-type microprocessor 102 perform a cooperative operation in accordance with the operation modes, to thereby obtain a desired operation result.

The neural network engine 100 is connected to the von Neumann-type microprocessor 102. The neural network engine 100 performs an operation (reaction) representing a characteristic determined by setting network configuration information indicating a network configuration to be formed and synapse weight information indicating a weight with respect to the network configuration. The neural network engine 100 also performs a reaction (operation) to an input (stimulus) from outside the neural network system 1, and outputs the result of the reaction (responds) to the von Neumann-type microprocessor 102.

The neural network engine 100 is configured to operate in two modes, namely a normal mode including a learning operation mode and a normal operation mode, and a configuration mode. The normal operation mode refers to the operation mode in which the neural network engine 100 performs normal operations, and the learning operation mode refers to the operation mode in which the synapse weight information is recalculated or the network configuration information is remade. The configuration mode refers to the operation mode in which the synapse weight information or the network configuration information set in the neural network engine 100 is set or updated.

The memory 101 is connected to the von Neumann-type microprocessor 102 through a data line and an address line, and contains the network configuration information and the synapse weight information. The memory 101 also contains a program to be executed by the von Neumann-type microprocessor 102.

The von Neumann-type microprocessor 102 may be, for example, a central processing unit (CPU) connected to the memory 101 through the data line and the address line. As stated above, the von Neumann-type microprocessor 102 is connected to the neural network engine 100.

The von Neumann-type microprocessor 102 performs a cooperative operation in accordance with the operation mode of the neural network engine 100. The von Neumann-type microprocessor 102 also receives an input (stimulus) from outside the neural network system 1, which is also received by the neural network engine 100, in a predetermined operation mode.

For example, when the neural network engine 100 is in the learning operation mode, the von Neumann-type microprocessor 102 receives an input (stimulus) from outside the neural network system 1, which is also received by the neural network engine 100. The von Neumann-type microprocessor 102 then executes a program of emulating an error propagation process of the neural network engine 100 utilizing the network configuration information and the synapse weight information, as well as the output (response) from the neural network engine 100, to thereby recalculate the synapse weight information or remake the network configuration information of the neural network engine 100.

When the neural network engine 100 is in the configuration mode, the von Neumann-type microprocessor 102 retrieves the network configuration information and the synapse weight information stored in the memory 101, and outputs the information to the neural network engine 100. By doing so, the von Neumann-type microprocessor 102 sets or updates the network configuration information and the synapse weight information of the neural network engine 100.

When the neural network engine 100 is in the normal operation mode, the von Neumann-type microprocessor 102 performs sequential program processing utilizing the output (response) from the neural network engine 100 and the program stored in the memory 101. Here, the operation mode of the neural network engine 100 can be changed by the von Neumann-type microprocessor 102.

The neural network system 1 is thus configured, so as to obtain a desired effect through cooperative operations in accordance with the operation mode.

Referring now to FIGS. 2A through 4B, operations of the neural network system 1 will be described.

Figure 2A:
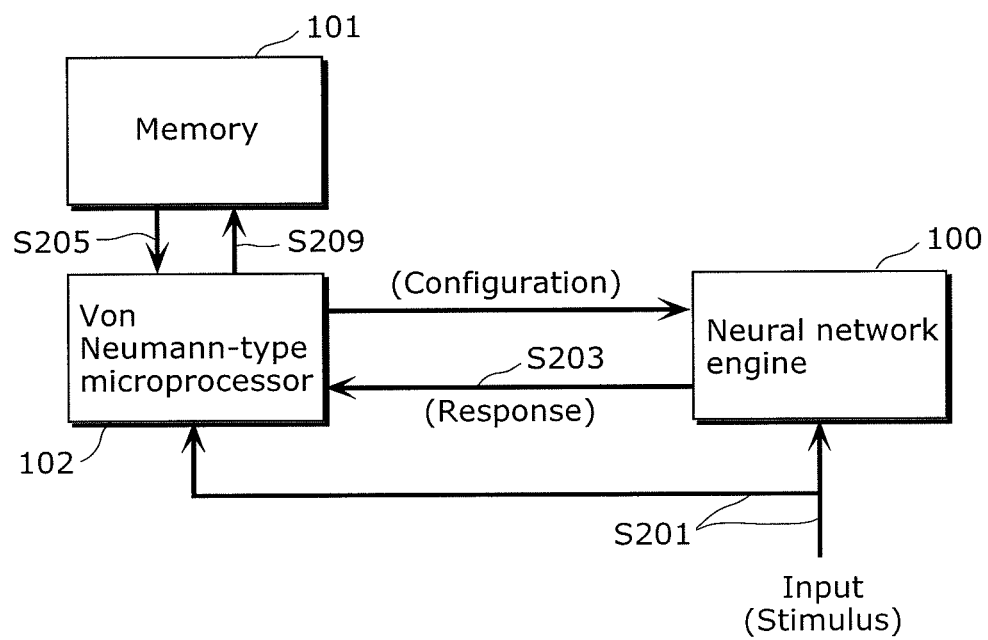
FIGS. 2A and 2B are diagrams for explaining a cooperative operation of the neural network system in a learning operation mode.
Figure 2B:
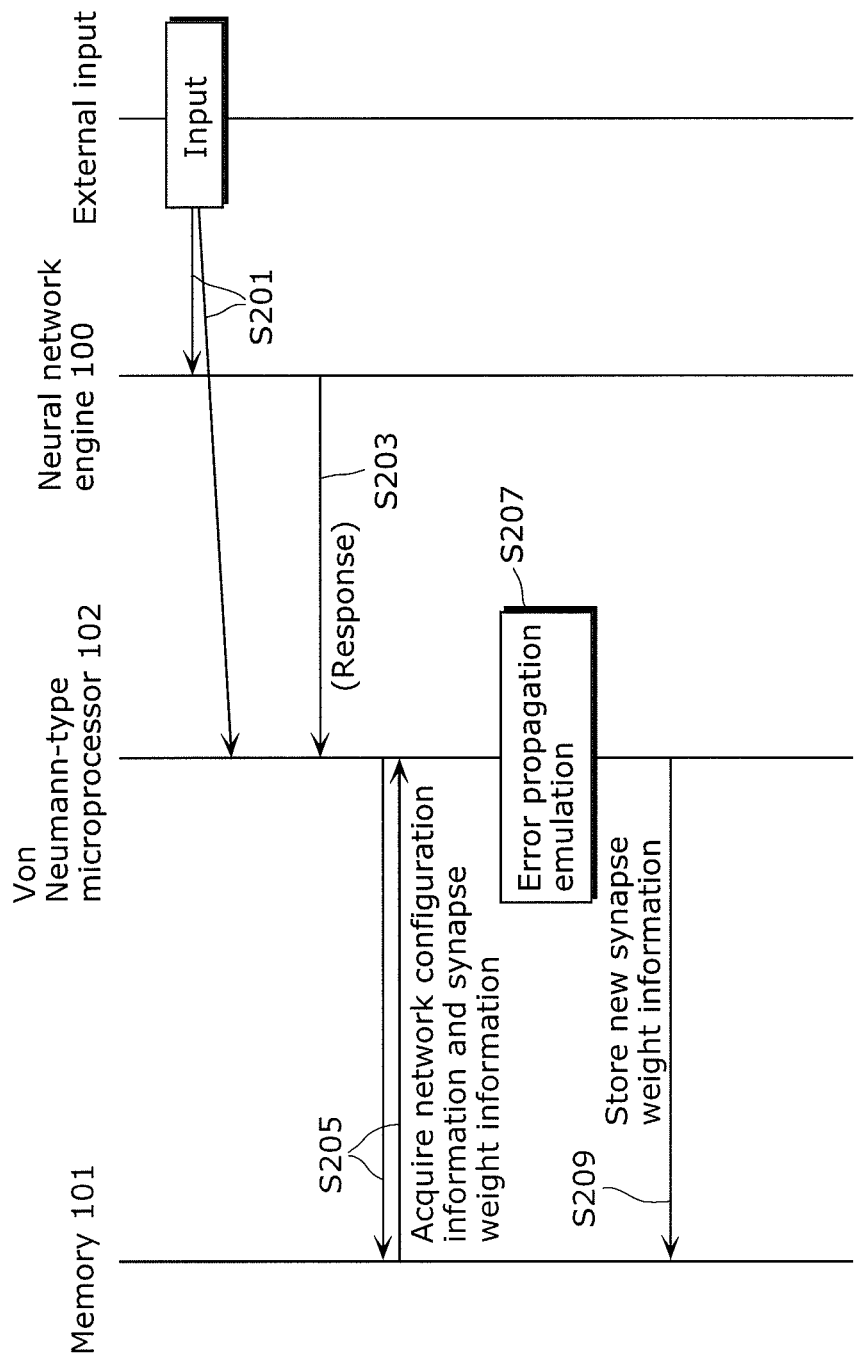

FIGS. 2A and 2B are diagrams for explaining a cooperative operation of the neural network system in a learning operation mode.

In the learning operation mode, to start with, the neural network engine 100 and the von Neumann-type microprocessor 102 receive an input (stimulus) from outside the neural network system 1 (S201).

The neural network engine 100 reacts (acts) to the input (stimulus) from outside, and outputs a result generated by the reaction (operation) to the von Neumann-type microprocessor 102 (S203).

Then the von Neumann-type microprocessor 102 retrieves the network configuration information and the synapse weight information of the neural network engine 100 from the memory 101 (S205).

The von Neumann-type microprocessor 102 then executes the program of emulating the error propagation process of the neural network engine 100 utilizing the network configuration information and the synapse weight information acquired as above, and the output (response) from the neural network engine 100, to thereby recalculate the synapse weight information of the neural network engine 100 (S207).

After the recalculation at S205, the von Neumann-type microprocessor 102 stores updated synapse weight information obtained by the recalculation in the memory 101 (S209).

In the neural network system 1, the neural network engine 100 and the von Neumann-type microprocessor 102 thus perform the cooperative operation in accordance with the learning operation mode. The von Neumann-type microprocessor 102 also serves to complement the learning of the neural network engine 100.

Here, when performing the program of emulating the error propagation process, the von Neumann-type microprocessor 102 may optimize the neural network configuration and store or reflect new network configuration information obtained by the optimization in the memory 101, in addition to recalculating the synapse weight information. In this case, further advancement of the learning result can be expected, because both of the synapse weight information and the network configuration information are updated.

Figure 3A:
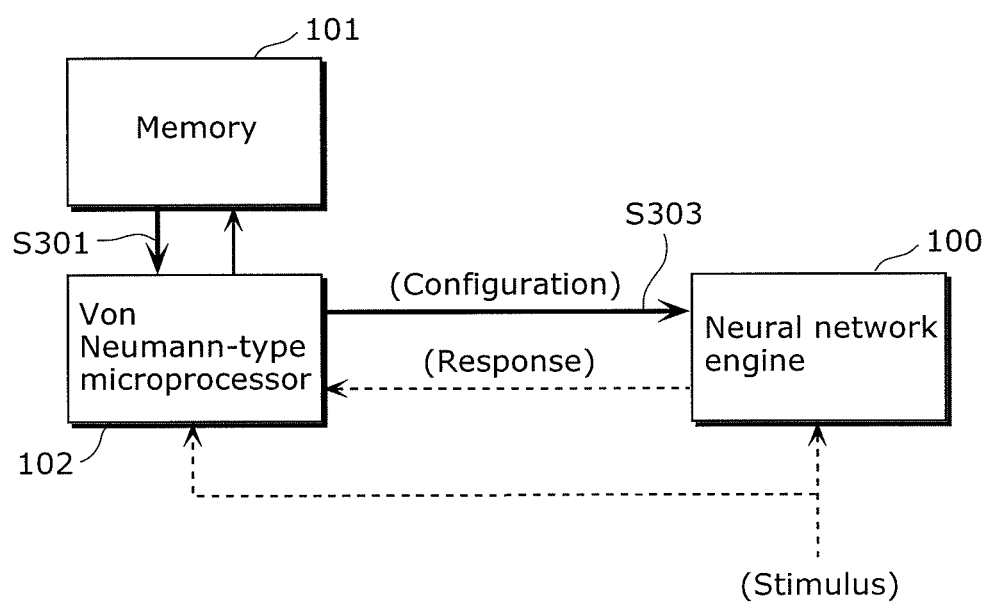
FIGS. 3A and 3B are diagrams for explaining a cooperative operation of the neural network system in a configuration operation mode.
Figure 3B:
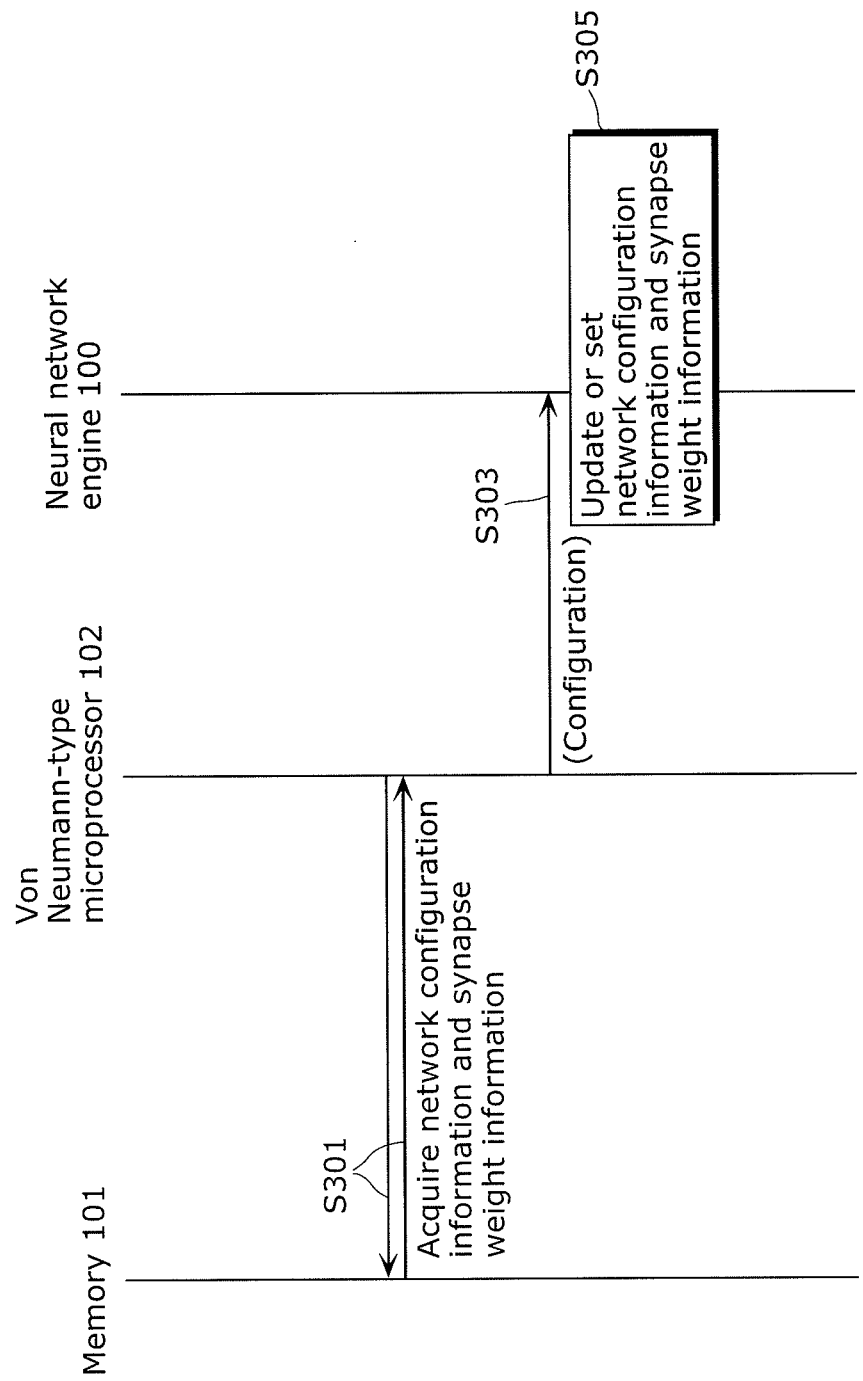

FIGS. 3A and 3B are diagrams for explaining a cooperative operation of the neural network system in the configuration operation mode.

In the configuration mode, von Neumann-type microprocessor 102 retrieves the network configuration information and the synapse weight information stored in the memory 101 (S301).

The von Neumann-type microprocessor 102 then outputs the network configuration information and the synapse weight information to the neural network engine 100 (configuration) as configuration data (S303), to thereby set or update the network configuration information and the synapse weight information of the neural network engine 100 (S305).

The neural network engine 100 and the von Neumann-type microprocessor 102 thus perform the cooperative operation in accordance with the configuration mode, in the neural network system 1.

Here, the network configuration information and the synapse weight information to be set in the neural network engine 100 are not limited to those made or updated in the learning operation mode described referring to FIGS. 2A and 2B. For example, the information may be obtained from an external storage device, in which case the operational function of the neural network engine 100 can be realized free from a limitation of storage capacity of the memory 101.

The memory 101 may contain a plurality of sets of the network configuration information and the synapse weight information. In this case, the neural network system 1 can perform a cooperative operation in accordance with the learning operation mode or the configuration mode, with respect to each of the sets. The neural network engine 100 may not only accept setting of a plurality of pieces of network configuration information and synapse weight information, but also learn on the basis of the plurality of pieces of network configuration information and synapse weight information.

Figure 4A:
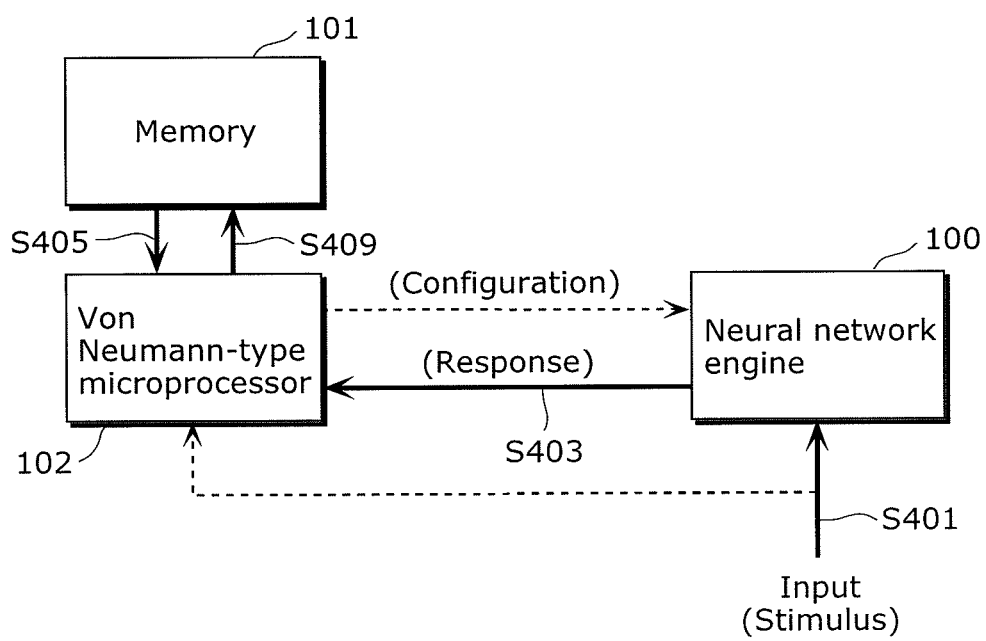
FIGS. 4A and 4B are diagrams for explaining a cooperative operation of the neural network system in a normal operation mode.
Figure 4B:
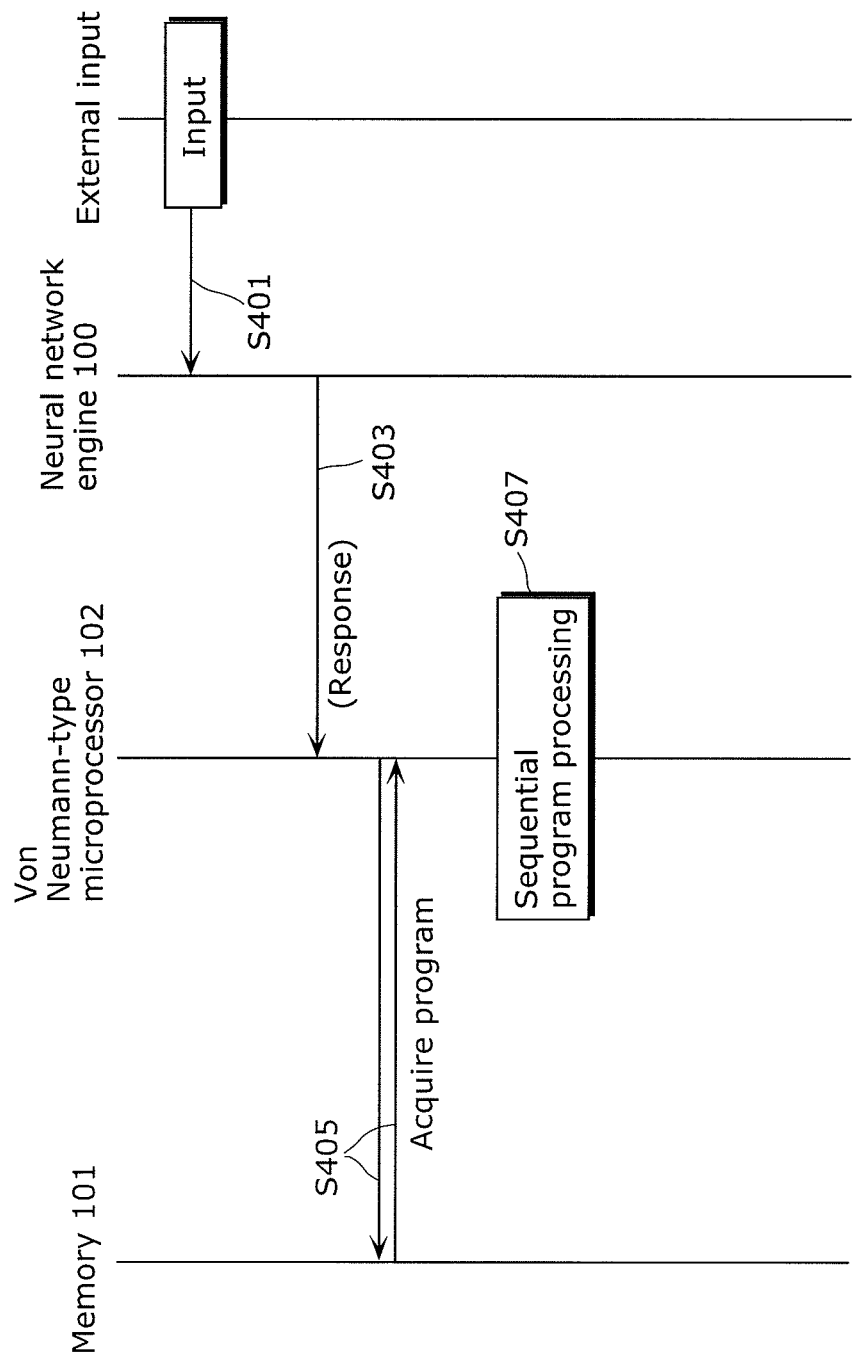

FIGS. 4A and 4B are diagrams for explaining a cooperative operation of the neural network system in a normal operation mode.

In the normal operation mode, the neural network engine 100 receives an input (stimulus) from outside the neural network system 1 (S401).

The neural network engine 100 reacts (acts) to the input (stimulus) from outside the neural network system 1, and outputs a result generated by the reaction (operation) to the von Neumann-type microprocessor 102 (S403).

The von Neumann-type microprocessor 102 retrieves a program from the memory 101 (S405).

The von Neumann-type microprocessor 102 then performs sequential program processing utilizing the output (response) from the neural network engine 100 and the program acquired from the memory 101 (S407).

The neural network engine 100 and the von Neumann-type microprocessor 102 thus perform the cooperative operation in accordance with the normal operation mode, in the neural network system 1. Such a cooperative operation enables execution of, for example, a menu display program based on an image recognition result obtained through a user interface process. Here, the memory 101 may contain a plurality of sets of the network configuration information and the synapse weight information. In this case, the neural network system 1 can execute time-division processing, or switch the operation modes for performing the cooperative operation.

Now, a process of determining the foregoing cooperative operations will be described hereunder.

FIG. 5 is a flowchart for explaining a process performed by a von Neumann-type microprocessor to determine each cooperative operation.

First, the von Neumann-type microprocessor 102 changes the operation mode of the neural network engine 100 to the configuration mode (S501), and sets the network configuration information and the synapse weight information of the neural network engine 100 (S502). This operation at S502 corresponds to the operations described referring to FIGS. 3A and 3B.

The von Neumann-type microprocessor 102 then changes the operation mode of the neural network engine 100 to the normal mode (S503).

After that, the von Neumann-type microprocessor 102 decides whether the operation mode of the neural network engine 100 is the learning operation mode or the normal operation mode (S504).

In the case where the operation mode of the neural network engine 100 is decided to be the normal operation mode (NO at S504), the von Neumann-type microprocessor 102 executes a normal program (S505). The operation at S505 corresponds to the operations described referring to FIGS. 4A and 4B.

On the other hand, in the case where the operation mode of the neural network engine 100 is decided to be the learning operation mode (YES at S504), the von Neumann-type microprocessor 102 executes the program of emulating the error propagation process (S506), and recalculates the synapse weight information (S507).

The von Neumann-type microprocessor 102 then stores the recalculated synapse weight information in the memory 101.

Here, the von Neumann-type microprocessor 102 may optimize the neural network configuration (S507) and store or reflect new network configuration information obtained by the optimization in the memory 101 (S508), in addition to recalculating the synapse weight information at S506. In this case, further advancement of the learning result can be expected, because both of the synapse weight information and the network configuration information are updated.

The operations at S506, S507, and S508 correspond to the operations described referring to FIGS. 3A and 3B.

That is how the von Neumann-type microprocessor 102 determines the cooperative operation to be performed, and performs the determined cooperative operation.

Figure 16A:
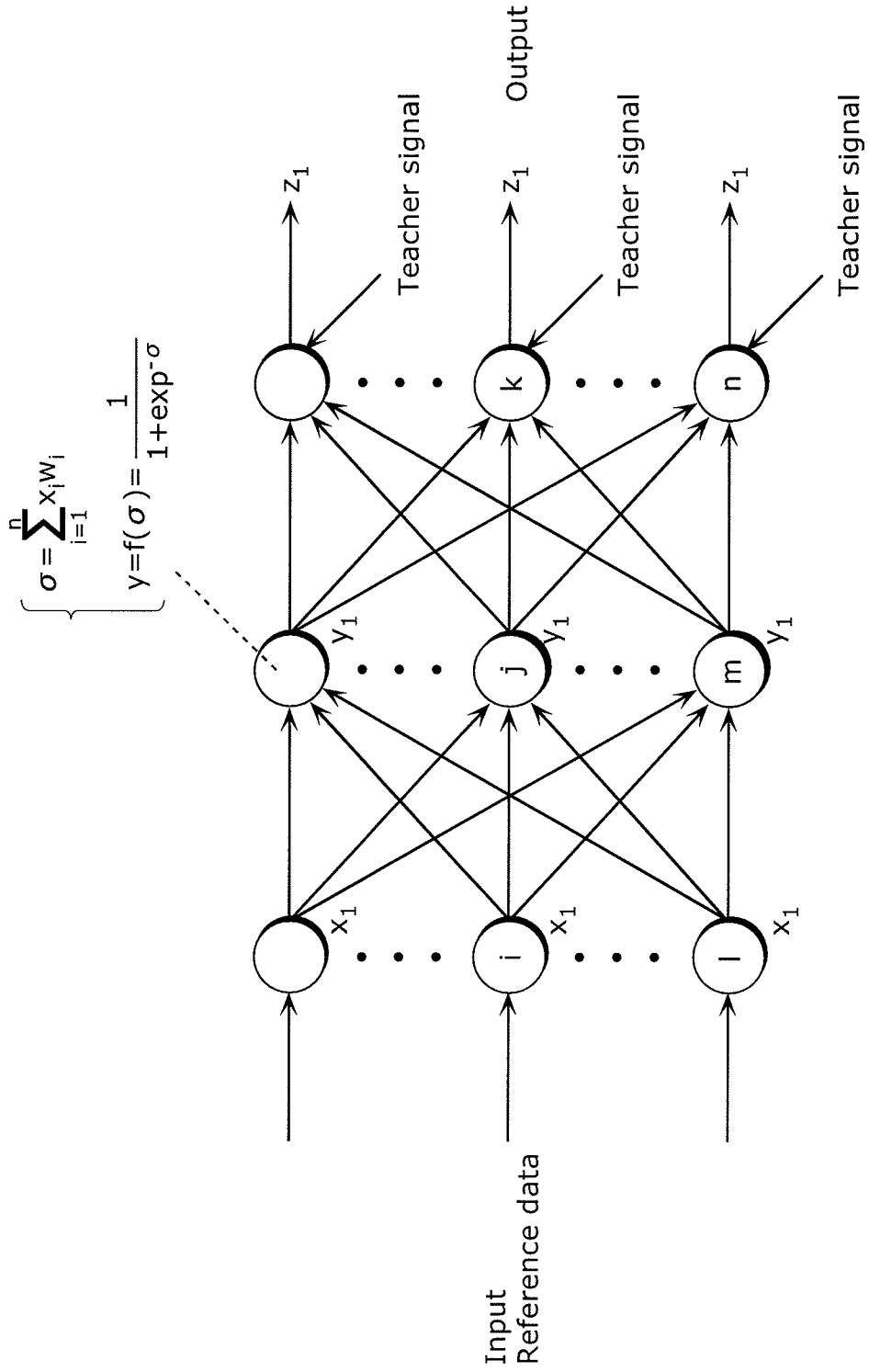
FIGS. 16A and 16B are diagrams showing an outline of a backward propagation process.
Figure 16B:
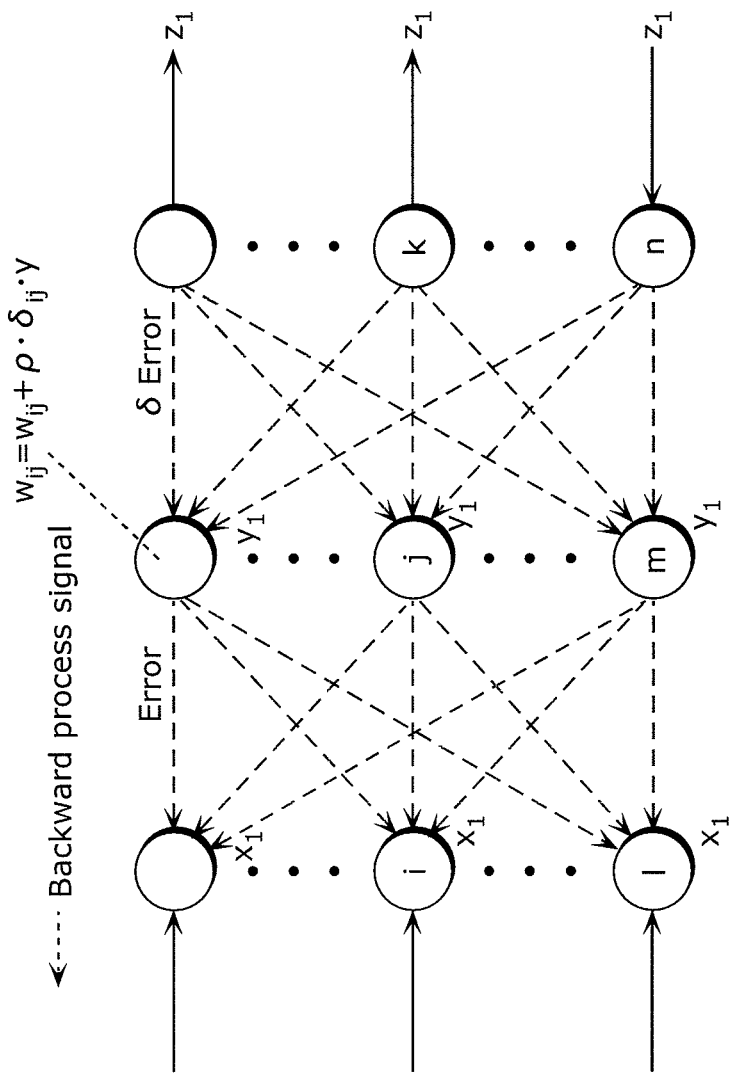
Figure 17:
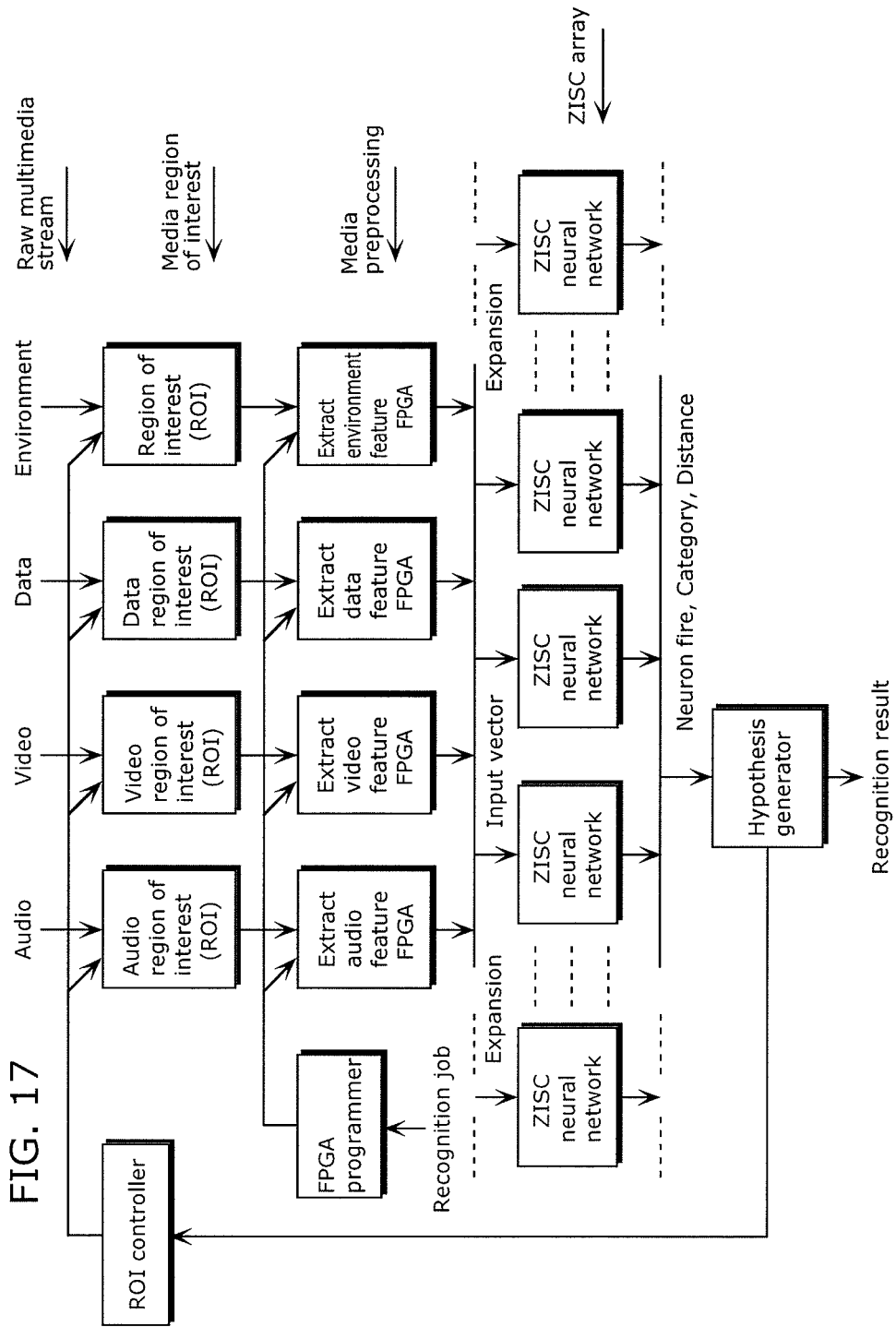
FIG. 17 is a block diagram of an image recognition system that employs a ZISC processor.

Thus, according to the embodiment 1 the von Neumann-type microprocessor 102 performs the normal sequential program processing in the normal operation mode, and serves as an auxiliary device for the neural network engine 100 to learn, in the learning operation mode. Such an arrangement eliminates the need to provide the signal lines routed upstream of the neural layers and the circuit for error calculation required for performing the backward propagation process, i.e., for the self-learning mechanism as shown in FIGS. 16A and 16B illustrating the conventional art. The embodiment 1 can therefore minimize the circuit resources for the self-learning mechanism such as the backward propagation process required by the conventional art.

The von Neumann-type microprocessor 102 can complement the process for which the neural network engine 100 is unsuitable, by performing the sequential program processing in the normal operation mode. Further, the neural network engine 100 is reconfigurable as stated above, and can be turned into various network configurations by setting appropriate network configuration information and synapse weight information in the configuration mode.

Embodiment 2

An embodiment 2 represents a specific example of the configuration of the neural network engine 100.

Figure 6A:
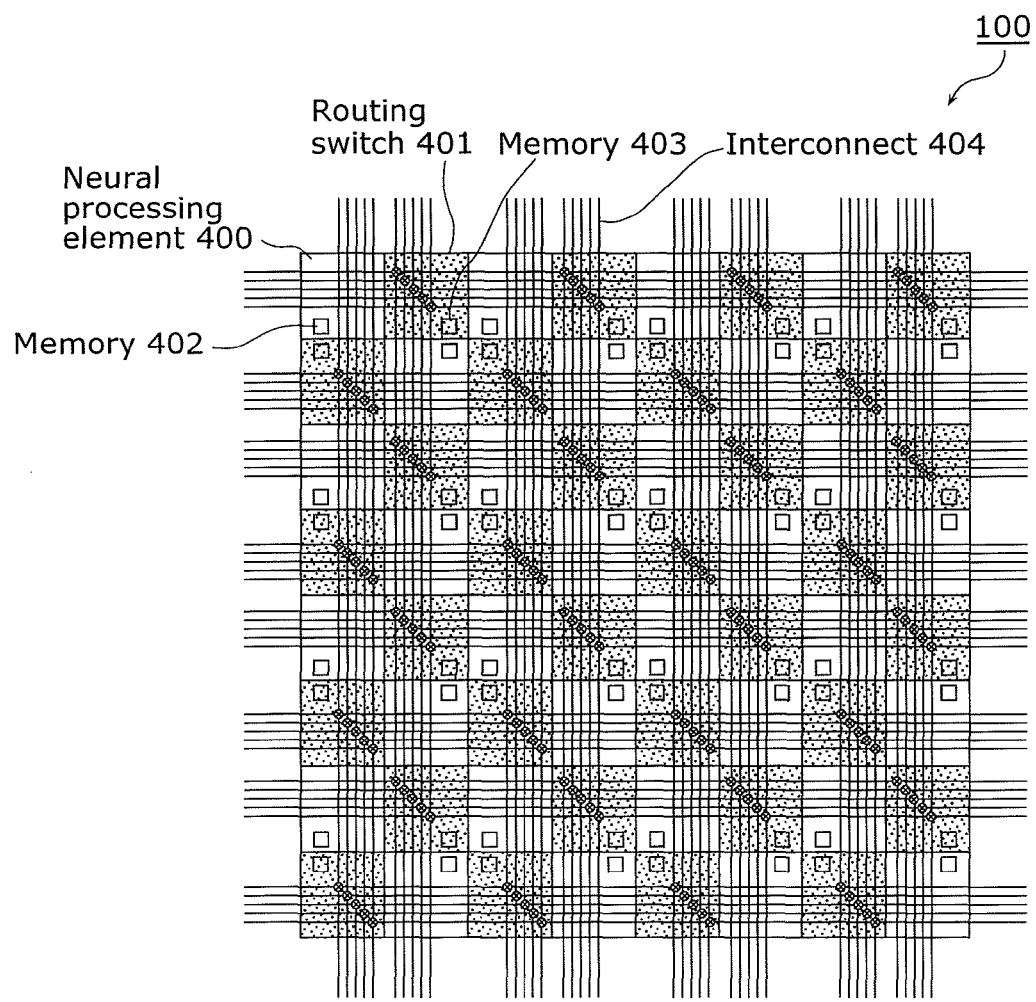
FIGS. 6A and 6B are schematic plan views of a neural network engine according to an embodiment 2.
Figure 6B:
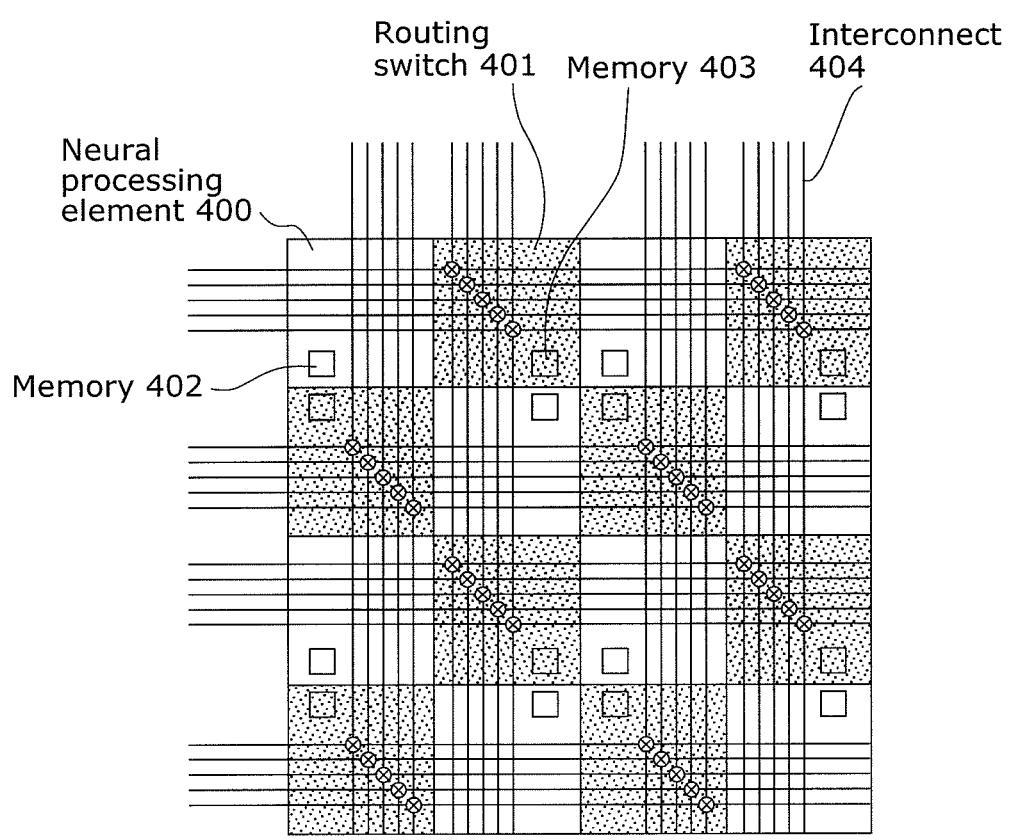

FIGS. 6A and 6B are schematic plan views of the neural network engine according to the embodiment 2.

The neural network engine 100 according to the embodiment 2 includes, as shown in FIGS. 6A and 6B, neural processing elements (NuPE) 400 that each perform neural signal processing, routing switches 401, memories 402 containing control information of the neural processing element 400, memories 403 containing control information of the routing switch 401, and interconnects 404.

As shown in FIG. 6B, the neural processing elements 400 and the routing switches 401 are alternately (in a checkerboard pattern) arranged and connected through the interconnects 404. Accordingly, any given neural processing elements 400 can communicate with each other through the routing switches 401.

Figure 7:
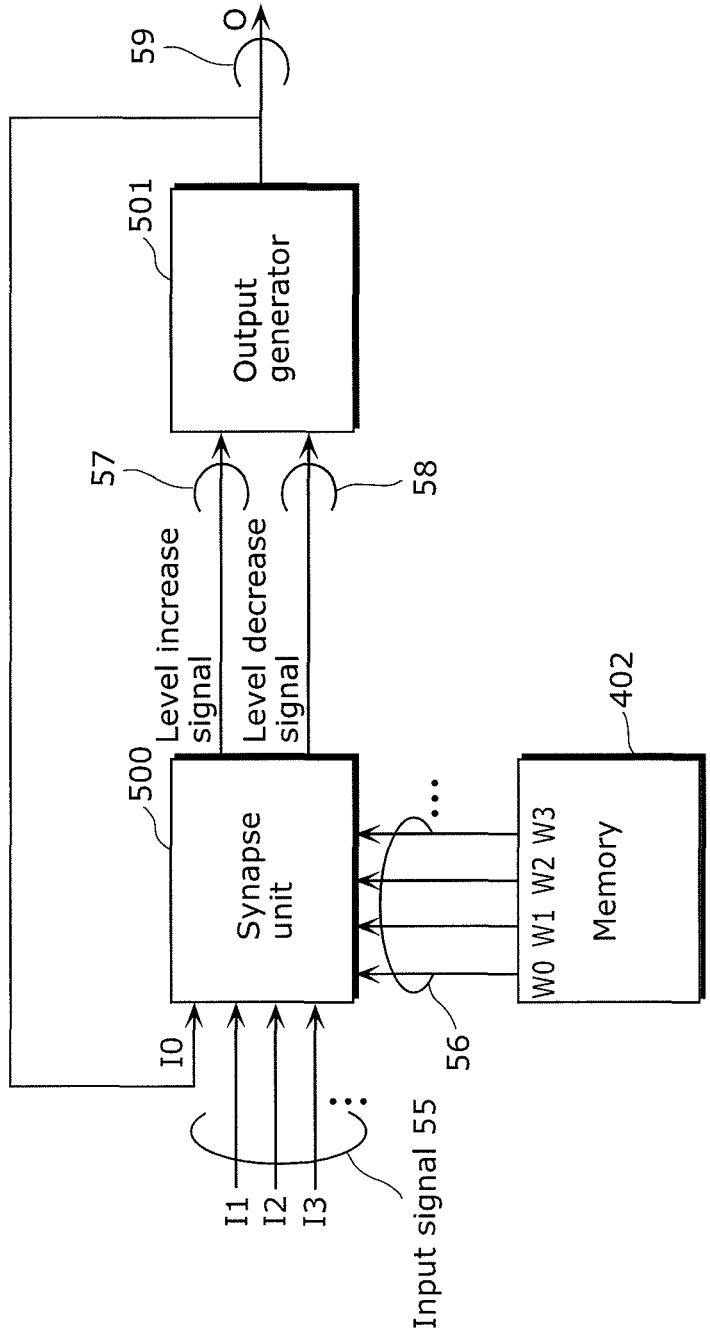
FIG. 7 is a block diagram showing an overall configuration of the neural processing element according to the embodiment 2.
Figure 8:
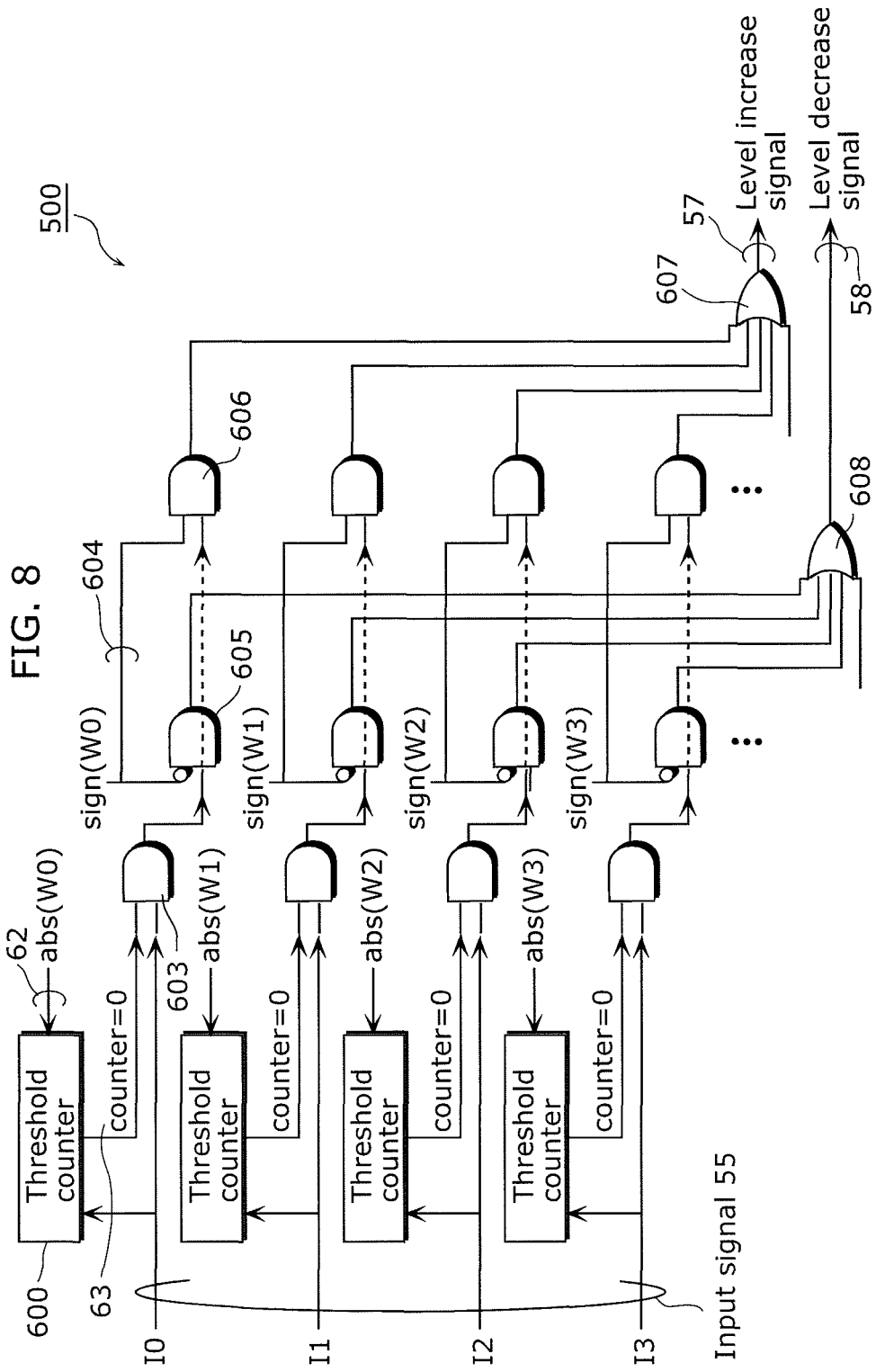
FIG. 8 is a schematic diagram showing a configuration of a synapse unit constituting the neural processing element according to the embodiment 2.
Figure 9:
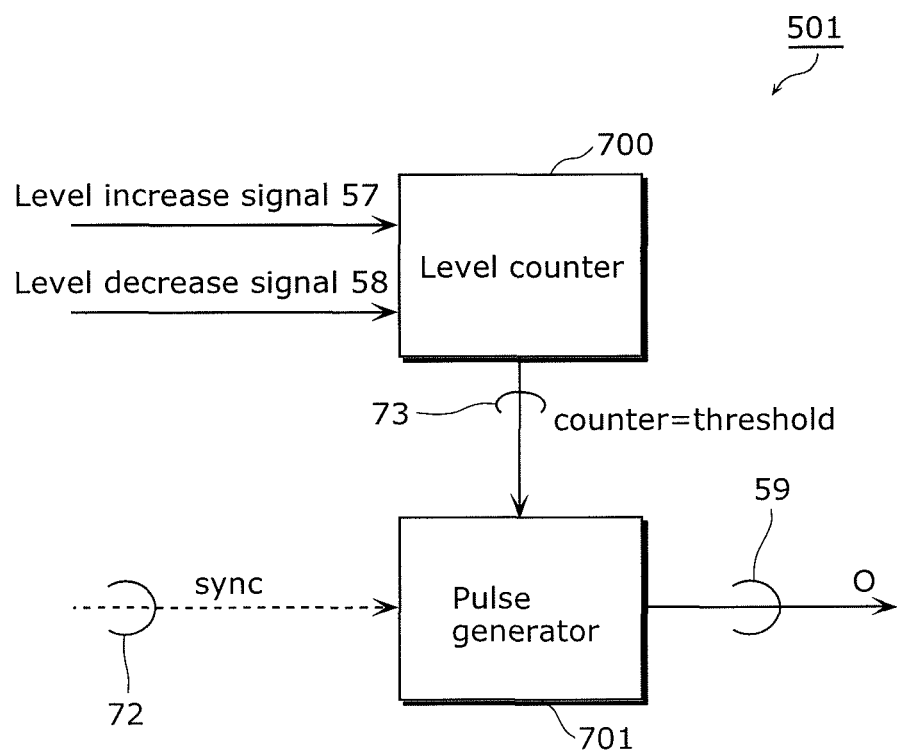
FIG. 9 is a block diagram showing a configuration of an output generator constituting the neural processing element according to the embodiment 2.

FIGS. 7, 8, and 9 illustrate a configuration of the neural processing element. FIG. 7 is a block diagram showing an overall configuration of the neural processing element according to the embodiment 2.

As shown in FIG. 7, each of the neural processing element 400 includes a synapse unit 500 corresponding to a synapse, an output generator 501, and the memory 402 containing the synapse weight information 56.

The synapse unit 500 makes a decision with respect to an input signal 55, and outputs a level increase signal 57 or a level decrease signal 58 to the output generator 501. The synapse unit 500 also receives an input of the synapse weight information 56 stored in the memory 402 and a neural processing result 59 outputted by the output generator 501.

The output generator 501 receives an input of the level increase signal 57 or the level decrease signal 58 from the synapse unit 500, and outputs the neural processing result 59.

The neural processing element 400 is configured as above. Here, a distinctive feature of the neural processing element 400 according to the embodiment 2 is that an input (symbol) is expressed by a plurality of pulses, in other words a single input signal 55 is handled as a plurality of pulse signals (I1, I2, I3, . . . ).

FIG. 8 is a schematic diagram showing a configuration of a synapse unit constituting the neural processing element according to the embodiment 2.

As shown in FIG. 8, the synapse unit 500 includes threshold counters 600, and logical gates including AND gates 603, AND gates 605, AND gates 606, an OR gate 607, and an OR gate 608.

The threshold counter 600 stores an absolute value 62 representing the synapse weight information as an initial value of the counter, and counts down the value each time a pulse signal of the input signal 55 is received. When the counter value becomes zero, the threshold counter 600 outputs a 0-detection signal 63 of a High level. In other words, when a desired number of pulses are inputted to the threshold counter 600, the 0-detection signal 63 is inputted to the AND gate 603. The AND gate 603 propagates, upon receipt of the input of the 0-detection signal 63, the pulse signals being simultaneously inputted to the subsequent gates, namely the AND gate 605 or the AND gate 606.

When the number of pulses expressing the input (symbol) is regarded as signal intensity (amplitude), the foregoing operations of the threshold counter 600 and the AND gate 603 are equivalent to making a reaction when the signal intensity (amplitude) exceeds a predetermined threshold. The threshold counter 600 and the AND gate 603 thus executes the weight calculation of the synapse.

The AND gates 605 and 606 receive an input of the pulse signal propagated from the AND gate 603. A sign of the weight value is inputted in the AND gates 605 and 606, and when the sign of the weight is positive the pulse signal is propagated to the AND gate 605 and ahead, and when the sign of the weight is negative the pulse signal is propagated to the AND gate 606 and ahead. In other words, the output of the AND gate 605 constitutes a pulse signal given a positive weight, and the output of the AND gate 606 constitutes a pulse signal given a negative weight. The respective pulse signals are grouped by the OR gates 607 and 608, so that the pulse signal given the positive weight are outputted as the level increase signal 57 constituted of an amplitude level increase pulse signal, and the pulse signal given the negative weight are outputted as the level decrease signal 58 constituted of an amplitude level decrease pulse signal.

Expressing thus the amplitude level of the input signal or the output signal by a plurality of pulse signals allows the number of interconnects constituting the synapse unit 500 to be decreased.

Since the pulse signal above referred to is processed in a digital logical circuit, quality fluctuation through the manufacturing process can be minimized compared with the case of utilizing an analog circuit, and is also compatible with popular digital circuits.

FIG. 9 is a block diagram showing a configuration of the output generator constituting the neural processing element according to the embodiment 2.

As shown in FIG. 9, the output generator 501 includes a level counter 700 and a pulse generator 701.

The level counter 700 receives an input of the level increase signal 57 and the level decrease signal 58 outputted from the synapse unit 500. The level counter 700 decreases the value of the counter by 1 each time the amplitude level decrease pulse signal constituting the level decrease signal 58 is inputted, and increases the value of the counter by 1 each time the amplitude level increase pulse signal constituting the level increase signal 57 is inputted. When the counter reaches a predetermined value a signal 73 is made active and outputted to the pulse generator 701.

The pulse generator 701 generates a pulse upon receipt of the signal 73 from the level counter 700.

The output generator 501 is configured as above.

Figure 13A:
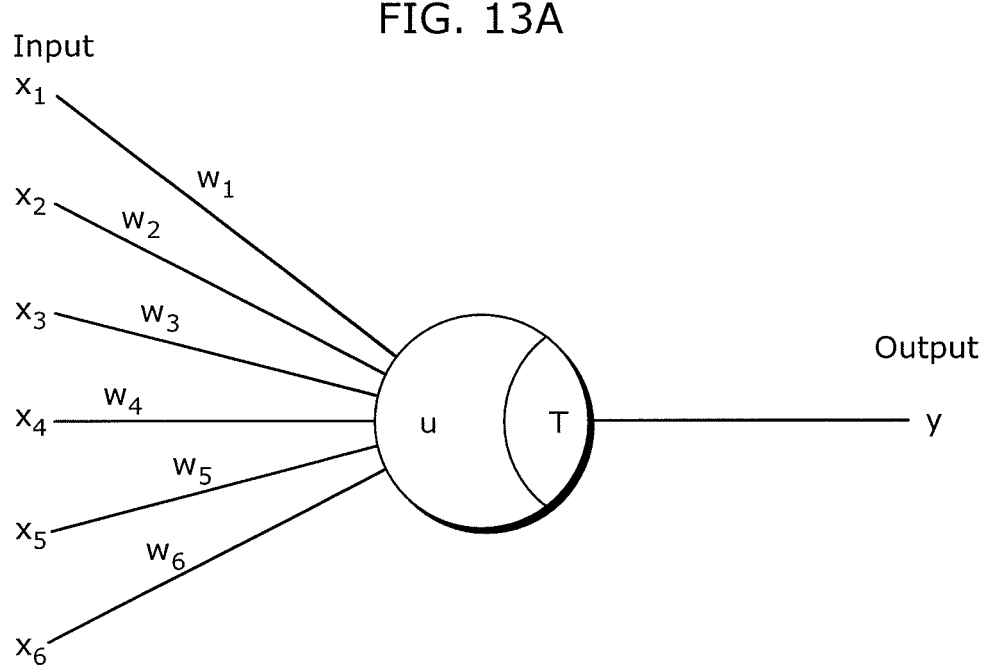
FIG. 13A is a diagram showing a popular mathematical model of a neuron cell.
Figure 13B:
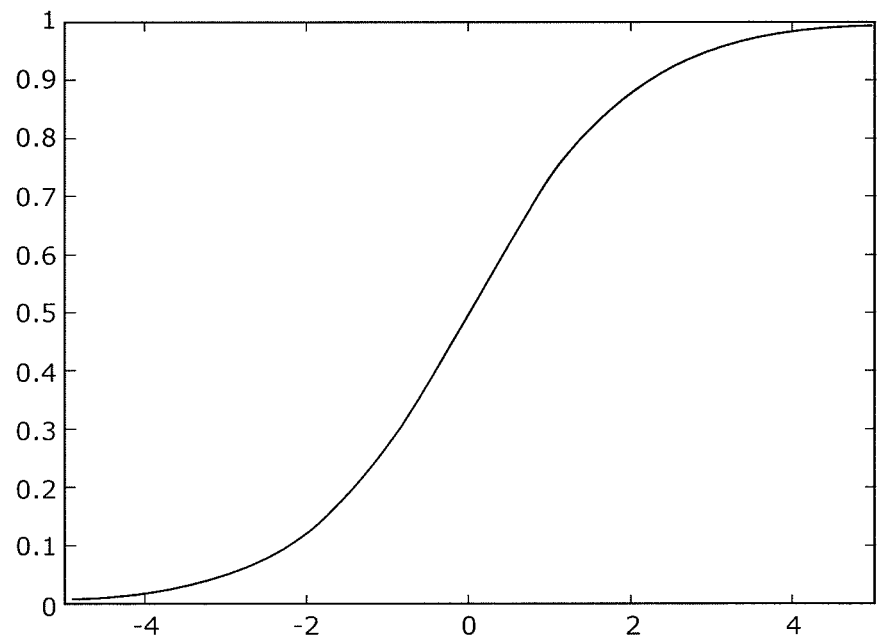
FIG. 13B is a graph showing a curve defined by a sigmoid function.

Thus, the synapse unit 500 and the output generator 501 perform the cooperative operation including inputting a signal the intensity (amplitude) of which is expressed by a plurality of pulse signals, and generating a pulse in the case where a total value obtained by applying the weight information is greater than a predetermined threshold, which constitutes a simplified process of the mathematical model shown in FIG. 13A.

Embodiment 3

An embodiment 3 represents an application example of the neural network system 1.

Figure 10A:
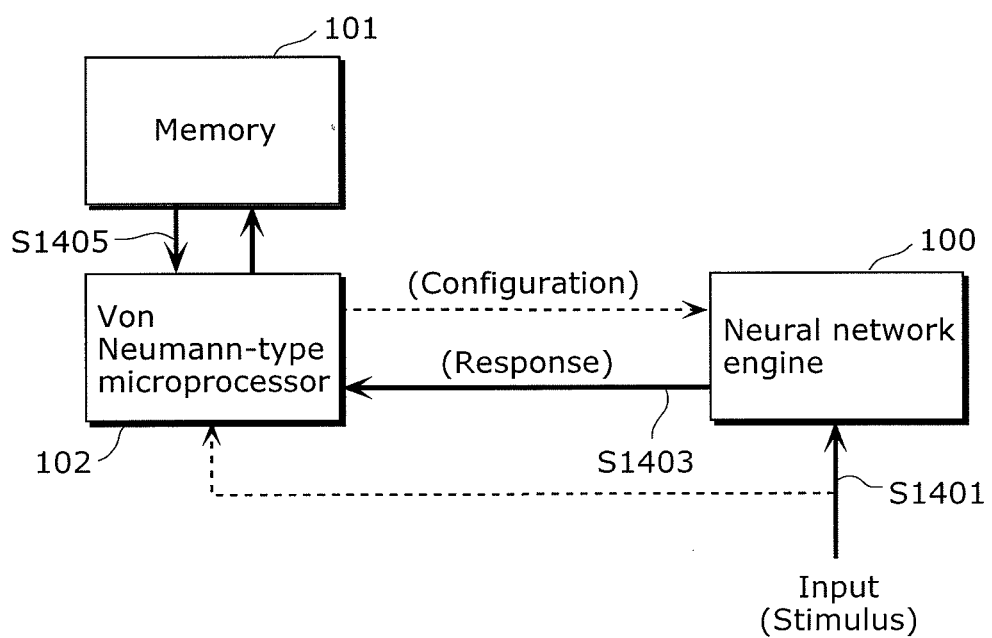
FIGS. 10A and 10B are diagrams for explaining an application example of a neural network system according to an embodiment 3.
Figure 10B:
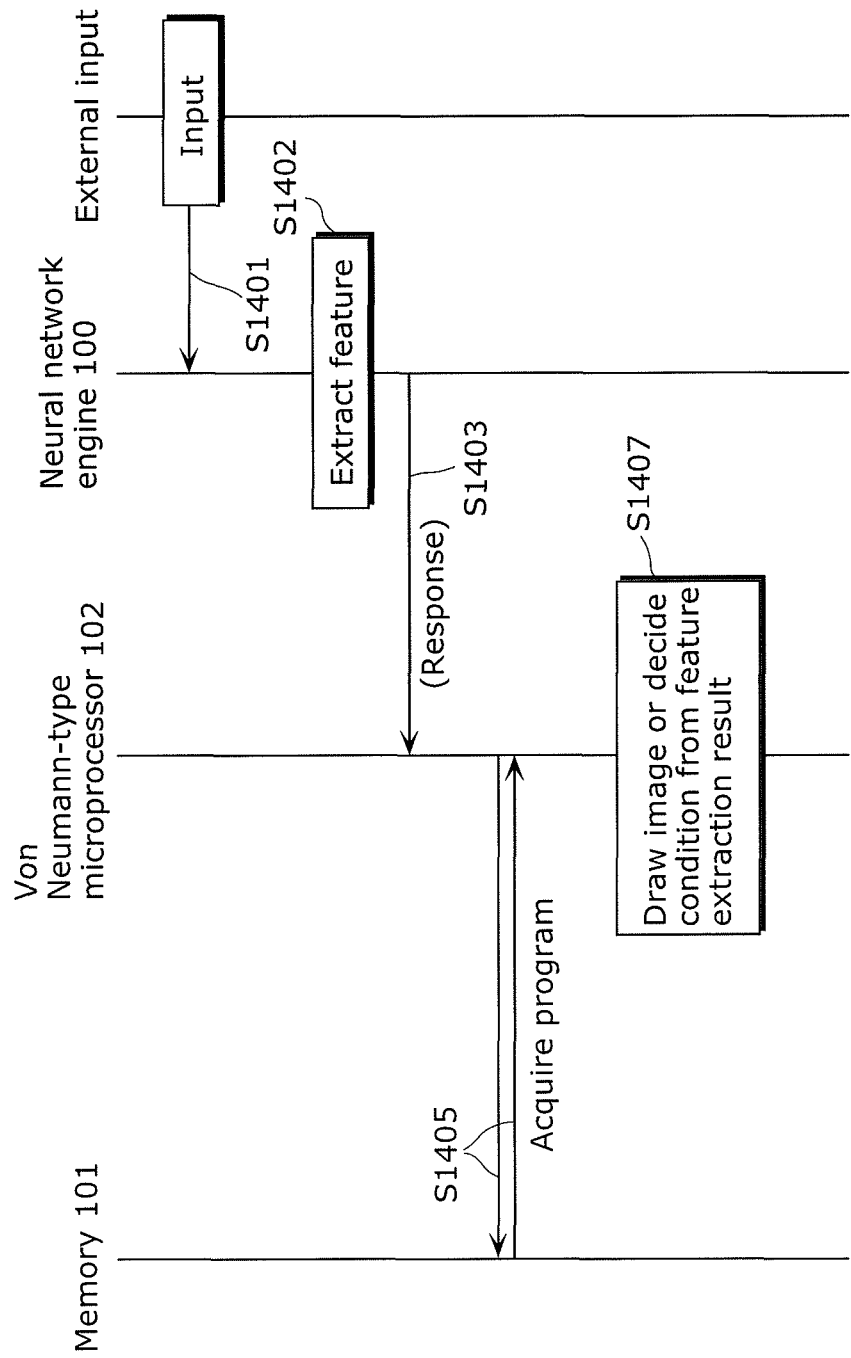

FIGS. 10A and 10B are diagrams for explaining an application example of a neural network system according to the embodiment 3. Referring to these drawings, a process performed by the neural network engine 100 and the von Neumann-type microprocessor 102 for deciding a feature will be described.

The neural network engine 100 shown in FIG. 10A constitutes a Gabor filter. The Gabor filter, which is known as a model of the initial visual field (V1) of a brain, is also known to be useful as a feature extraction model.

For the neural network engine 100, the network configuration information indicating the network configuration that constitutes the Gabor filter, and the synapse weight information indicating the characteristic of the Gabor filter in that network configuration are set by the von Neumann-type microprocessor 102.

An operation of the neural network engine 100 will be described hereunder.

Referring to FIG. 10B, the neural network engine 100 receives an input (stimulus) of image data for example, from outside the neural network system 1 in the normal operation mode (S1401).

The neural network engine 100 then makes a reaction (operation) to the image data, such as executing feature extraction or face feature decision from the image data (S1402), and outputs a feature extraction result generated by the reaction (operation) to the von Neumann-type microprocessor 102 as a response (S1403).

The von Neumann-type microprocessor 102 retrieves a program from the memory 101 (S1405).

The von Neumann-type microprocessor 102 then performs sequential program processing utilizing the output (response) of the neural network engine 100 and the program acquired from the memory 101 (S1407). In this process, the von Neumann-type microprocessor 102 performs sequential program processing involving, for example, image drawing or condition decision such as an update of GUI, risk assessment, person database search, and so forth, on the basis of the output (response) of the neural network engine 100.

Figure 11A:
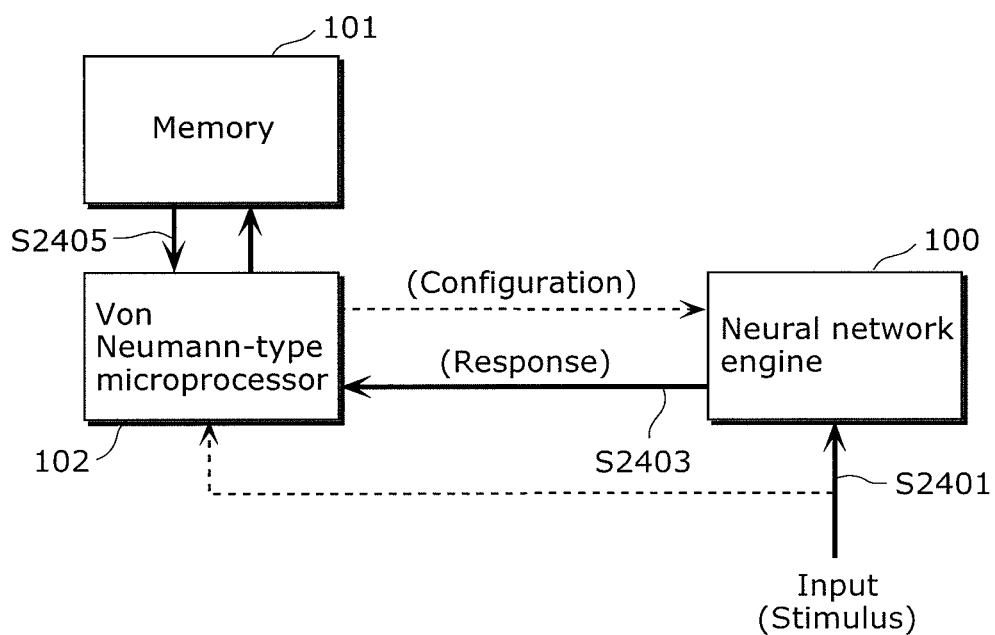

FIGS. 11A and 11B are diagrams for explaining another application example of the neural network system according to the embodiment 3. Referring to these drawings, a process performed by the neural network engine 100 and the von Neumann-type microprocessor 102 for controlling the operation will be described.

Figure 14A:
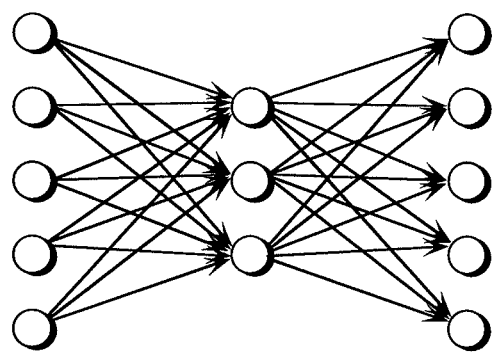
FIG. 14A is a diagram showing a typical structure of a multilayer network.
Figure 14B:
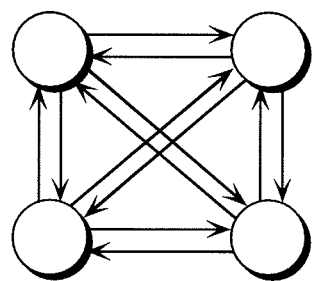
FIG. 14B is a diagram showing a typical structure of a mutual connected network.
Figure 14C:
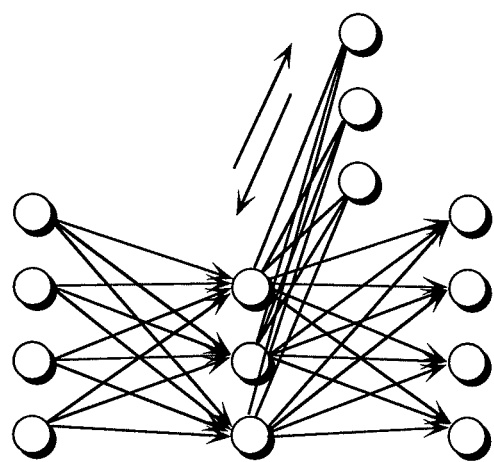
FIGS. 14C and 14D are diagrams showing a typical structure of a neural network.
Figure 14D:
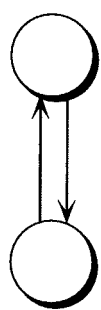
Figure 15:
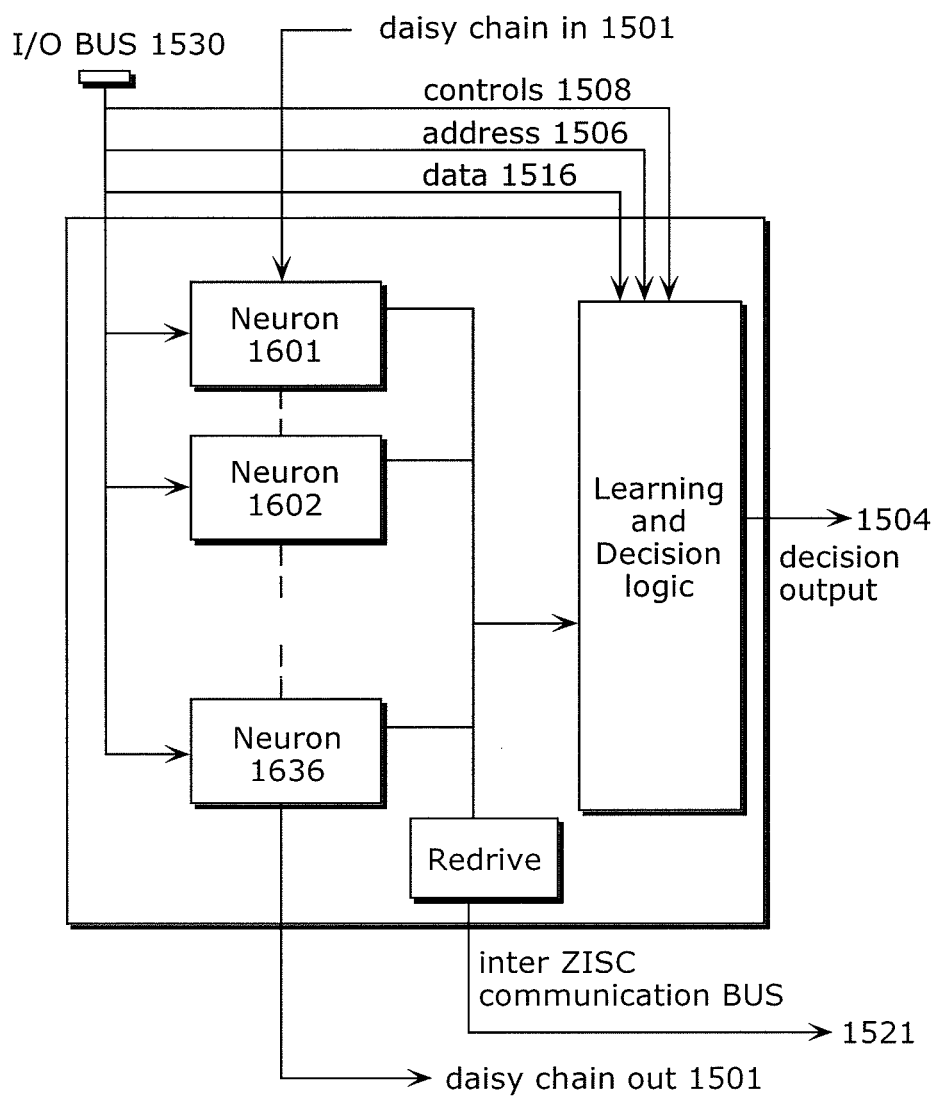
FIG. 15 is a block diagram of a processor in which the neural network is implemented.

The neural network engine 100 shown in FIG. 11A constitutes a central pattern generator (CPG) shown in FIG. 14D. The CPG, which is known as a central movement pattern generator of the spine dominating the walking rhythm in a creature's walking control mechanism, is also known as a network constituted of a plurality of mutually connected neural cells.

For the neural network engine 100, the network configuration information indicating the network configuration that constitutes the central pattern generator, and the synapse weight information indicating the characteristic of the central pattern generator in that network configuration are set by the von Neumann-type microprocessor 102.

In this case, the neural network engine 100 operates as follows.

Referring to FIG. 11B, the neural network engine 100 receives an input (stimulus) of, for example, environmental information from an acceleration sensor or the like, from outside the neural network system 1 in the normal operation mode (S2401).

The neural network engine 100 then makes a reaction (operation) to the environmental information, such as performing a posture control process (S2402), and outputs a posture control parameter generated by the reaction (operation) to the von Neumann-type microprocessor 102 as a response (S2403).

The von Neumann-type microprocessor 102 retrieves a program from the memory 101 (S2405).

The von Neumann-type microprocessor 102 then performs sequential program processing utilizing the output (response) of the neural network engine 100 and the program acquired from the memory 101 (S2407). In this process, the von Neumann-type microprocessor 102 performs sequential program processing involving for example a drive control such as a motor control, on the basis of the output (response) of the neural network engine 100.

Thus, various types of network configuration information and synapse weight information are utilized in the neural network system 1 for various purposes.

Embodiment 4

In the embodiment 2, a statement was made that the neural processing element 400 employs digital pulses to express signal intensity (amplitude), and is hence compatible with popular digital circuits. An embodiment 4 represents an application example of the neural processing element 400 which is compatible with digital circuits.

Figure 12:
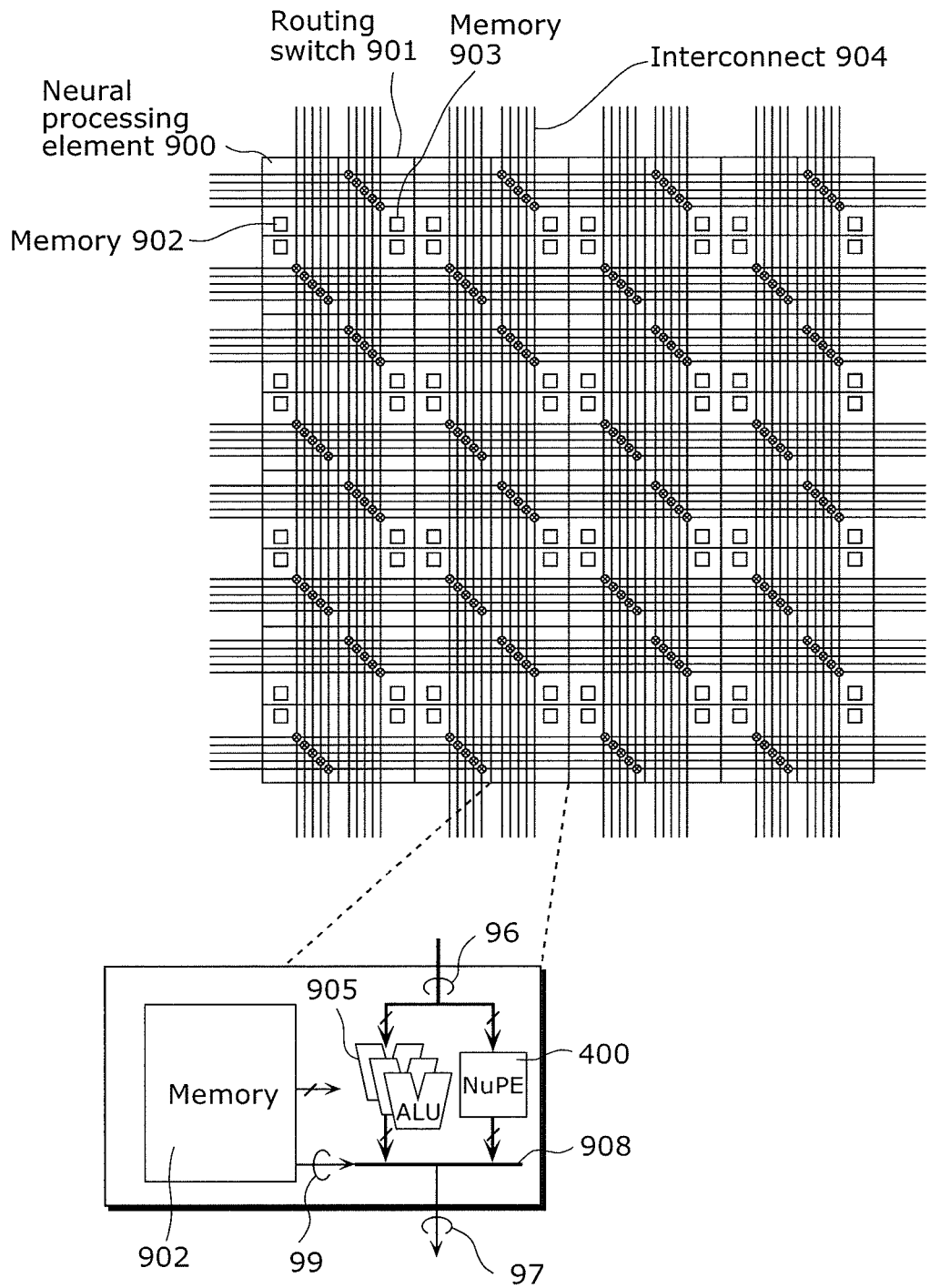
FIG. 12 is a schematic plan view for explaining an application example of a neural processing element according to an embodiment 4, which is compatible with digital circuits.

FIG. 12 is a schematic plan view for explaining an application example of the neural processing element 400, which is compatible with digital circuits. The neural processing element 400 shown in FIG. 12 includes processing elements (PE) 900 that each perform digital signal processing, routing switches 901, memories 902 containing control information of the processing element 900, memories 903 containing control information of the routing switch 901, and interconnects 904.

As shown in FIG. 12, the processing elements 900 and the routing switches 901 are alternately (in a checkerboard pattern) arranged. Accordingly, any given neural processing elements 900 can communicate with each other through the routing switches 901.

Each of the processing elements 900 includes a plurality of calculators 905 that performs logical calculations, the neural processing element 400, and a multiplexer 908. In the processing element 900, the output of which of the plurality of calculators 905 or the neural processing element 400 is to be selected can be decided on the basis of a multiplexer control signal 99 outputted from the memory 902.

The neural processing element 400 according to the embodiment 4 is configured as above. Such a configuration allows the input signal 96 and the output signal 97 to be shared by the calculator 905 and the neural processing element 400, thereby enabling the both functions to be implemented without increasing the number of interconnects 904.

As described thus far, the neural network system 1 according to the present invention includes the von Neumann-type microprocessor 102 and the reconfigurable neural network engine 100, and is capable of performing, for example, the backward propagation process and the sequential program processing through cooperative operations between the von Neumann-type microprocessor 102 and the neural network engine 100. In other words, the present invention enables the backward propagation process to be performed through the neural network emulation process by the von Neumann-type microprocessor 102 and generation of the reference data by the neural network engine 100.

Therefore, the circuit resources for the self-learning mechanism such as the backward propagation process required by the conventional art can be minimized.

Further, the von Neumann-type microprocessor 102 can complement the process for which the neural network engine 100 is unsuitable, by performing the sequential program processing in the normal operation mode. In addition, the neural network engine 100 is reconfigurable, and hence can be reconfigured into various network configurations by the von Neumann-type microprocessor 102.

Thus, the present invention provides a neural network system that can minimize circuit resources for constituting a self-learning mechanism and that can be reconfigured into network configurations suitable for various purposes. Further, since the von Neumann-type microprocessor is capable of performing sequential program processing, the process for which the neural network engine is unsuitable can be complemented.

The various purposes can be exemplified by a user interface associated with GUI including a neural network system having a feature of a reconfigurable neural network, and a recognition and avoidance system for hazardous objects for vehicles.

Therefore, minimizing the circuit resources for the self-learning mechanism, and making it possible to reconfigure the neural network into configurations suitable for various purposes and to perform sequential program processing enable fuzzy processes such as the user interface and the recognition and avoidance system for hazardous objects for vehicles to be performed at a high speed.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is suitably applicable to a neural network system, and more particularly to such neural network systems that perform fuzzy processes at a high speed, such as the user interface associated with GUI and the recognition and avoidance system for hazardous objects for vehicles.

What is claimed is:

1. A neural network system comprising:
a neural network engine that operates in a first operation mode and a second operation mode and performs an operation representing a characteristic determined by setting network configuration information indicating a network configuration to be formed and weight information indicating a weight with respect to the network configuration; and
a von Neumann-type microprocessor that performs a cooperative operation in accordance with the first operation mode or the second operation mode together with said neural network engine, said von Neumann-type microprocessor being connected to said neural network engine,
wherein said neural network engine includes:
a neural processing element that performs neural signal processing;
a routing switch;
a memory containing control information of said neural processing element;
a memory containing control information of said routing switch;
an interconnect, and said von Neumann-type microprocessor recalculates the weight information or remake the network configuration information as a cooperative operation according to the first operation mode; and sets or updates the network configuration information or the weight information set in said neural network engine, as a cooperative operation according to the second operation mode.

2. The neural network system according to claim 1, wherein said von Neumann-type microprocessor executes a program of emulating an error propagation process of said neural network engine as a cooperative operation according to the first operation mode, to thereby recalculate the weight information or remake the network configuration information.

3. An operation method to be performed by a neural network system including a neural network engine that operates in a first operation mode and a second operation mode and performs an operation representing a characteristic determined by setting network configuration information and weight information with respect to the network configuration, and a von Neumann-type microprocessor connected to the neural network engine for performing a cooperative operation in accordance with the first operation mode or the second operation mode together with the neural network engine, said method comprising causing the von Neumann-type microprocessor to:

perform a first cooperative operation including recalculating the weight information or remaking the network configuration information as a cooperative operation according to the first operation mode; and perform a second cooperative operation including setting or updating the network configuration information or the weight information set in the neural network engine, as a cooperative operation according to the second operation mod;

wherein said neural network engine includes neural processing elements, routing switches and interconnects, said routing switches and interconnects allowing for connection of said neural processing elements to one another.

4. The method according to claim 3, wherein said causing the von Neumann-type microprocessor to perform a second cooperative operation includes causing the von Neumann-type microprocessor to:

perform a first operation mode change including changing the operation mode of the neural network engine to the second operation mode;

set or update the network configuration information or the weight information set in the neural network engine, as a cooperative operation according to the second operation mode; and perform a second operation mode change including changing the operation mode of the neural network engine to an operation mode different from the second operation mode.

5. The method according to claim 3, further comprising causing the von Neumann-type microprocessor to decide whether the operation mode of the neural network engine is the first operation mode, wherein said causing the von Neumann-type microprocessor to perform a first cooperative operation includes causing the von Neumann-type microprocessor to:

execute emulation of the error propagation process as a cooperative operation according to the first operation mode, in the case where the von Neumann-type microprocessor has decided that the operation mode of the neural network engine is the first operation mode; and recalculate the weight information or remake the network configuration information on the basis of a result of the emulation.

6. The method according to claim 5, further comprising causing the von Neumann-type microprocessor to execute a program in the case where the von Neumann-type microprocessor has decided that the operation mode of the neural network engine is different from the first operation mode and the second operation mode.

7. The neural network system according to claim 1, wherein said neural network engine includes a plurality of said neural processing elements, a plurality of said routing switches and a plurality of said interconnects, said plurality of routing switches and plurality of interconnects allowing for connection of said plurality of neural processing elements to one another.

8. The neural network system according to claim 7, wherein said plurality of neural processing elements and said plurality of routing switches are alternately arranged in a checkerboard pattern.

9. The neural network system according to claim 7, wherein any one of said plurality of neural processing elements can be connected to any other one of said plurality of neural processing elements via said plurality of routing switches and said plurality of interconnects.

10. The method according to claim 3, wherein said neural processing elements and said routing switches are alternately arranged in a checkerboard pattern.

11. The method according to claim 3, wherein any one of said neural processing elements can be connected to any other one of said neural processing elements via said routing switches and said interconnects.

* * * * *